US011252613B2

(12) United States Patent
Condoluci et al.

(10) Patent No.: US 11,252,613 B2
(45) Date of Patent: Feb. 15, 2022

(54) DYNAMIC BEARER VALIDITY

(71) Applicant: Telefonaktiebolaget LM Ericsson (publ), Stockholm (SE)

(72) Inventors: Massimo Condoluci, Solna (SE); Stefano Sorrentino, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/044,898

(22) PCT Filed: Apr. 11, 2019

(86) PCT No.: PCT/EP2019/059299
§ 371 (c)(1),
(2) Date: Oct. 2, 2020

(87) PCT Pub. No.: WO2019/201747
PCT Pub. Date: Oct. 24, 2019

(65) Prior Publication Data
US 2021/0153078 A1     May 20, 2021

Related U.S. Application Data

(60) Provisional application No. 62/658,883, filed on Apr. 17, 2018.

(51) Int. Cl.
*H04W 28/24*     (2009.01)
*H04W 28/08*     (2009.01)
(Continued)

(52) U.S. Cl.
CPC ........... *H04W 28/24* (2013.01); *H04M 15/66* (2013.01); *H04W 28/0268* (2013.01); *H04W 28/0908* (2020.05)

(58) Field of Classification Search
CPC ............. H04W 28/24; H04W 28/0908; H04W 28/0268; H04M 15/66; H04L 29/06523;
(Continued)

(56) References Cited

U.S. PATENT DOCUMENTS 7,746,843 B2 * 6/2010 Chen ................... H04L 47/15
370/351
8,640,186 B2 * 1/2014 Castellanos Zamora ..................
H04L 12/14
726/1
(Continued)

FOREIGN PATENT DOCUMENTS

WO  WO-2004084502 A1 * 9/2004 ............. H04L 47/70
WO  2018052172 A2   3/2018

OTHER PUBLICATIONS

PCT International Search Report and Written Opinion dated May 29, 2019 for International Application No. PCT/EP2019/059299, 9 pages.
(Continued)

*Primary Examiner* — Mehmood B. Khan
(74) *Attorney, Agent, or Firm* — Sage Patent Group

(57) ABSTRACT

A method in an access network (200) including a radio access network (100) and a packet data network gateway (P-GW) includes receiving (702), at a network node (510) in the access network, a service setup request (615) from an external service via a packet switched data communication network (580), wherein the service setup request is to set up a packet switched connection between the external service and a wireless terminal (10) served by the radio access network, negotiating (704) a quality of service, QoS, level with the external service for the packet switched connection, wherein the QoS level includes a plurality of QoS parameters including a minimum QoS duration, and causing (706) the packet data network gateway to establish a bearer (410)
(Continued)

between the packet data network gateway and the wireless terminal, the bearer having the QoS level.

20 Claims, 16 Drawing Sheets

(51) Int. Cl.
*H04M 15/00* (2006.01)
*H04W 28/02* (2009.01)

(58) Field of Classification Search
CPC ......... H04L 29/08954; H04L 29/08108; H04L 29/08792; H04L 41/5003; H04L 41/5006; H04L 41/5067; H04L 47/24; H04L 67/322; H04L 51/26; H04L 2012/5638; H04L 47/2491; H04L 41/50
See application file for complete search history.

(56) References Cited

U.S. PATENT DOCUMENTS

| | | | |
|---|---|---|---|
| 2007/0111698 A1* | 5/2007 | Mysore | ............... H04L 47/2475 455/338 |
| 2011/0314145 A1* | 12/2011 | Raleigh | ............... H04L 43/0882 709/224 |
| 2012/0008525 A1 | 1/2012 | Koskinen | |
| 2015/0079926 A1* | 3/2015 | Gonzalez Plaza | .. H04L 12/1492 455/406 |
| 2017/0237790 A1* | 8/2017 | Patel | ....................... H04W 4/10 709/203 |
| 2017/0288886 A1* | 10/2017 | Atarius | ............... H04L 65/1063 |
| 2017/0359186 A1* | 12/2017 | Atarius | ................ H04M 15/61 |
| 2018/0199229 A1* | 7/2018 | Lee | ....................... H04W 76/14 |
| 2019/0098692 A1* | 3/2019 | Atarius | ................ H04W 48/16 |

OTHER PUBLICATIONS

Catt et al., 3GPP TSG-SA2 Meeting #68, S2-088050, "Update to EPS Bearer and QoS", Qingdao, China, Oct. 13-17, 2008, 7 pages.
3GPP, 3GPP TS 36.300, Technical Specification Group Radio Access Network, "Evolved Universal Terrestrial Radio Access (E-UTRA) and Evolved Universal Terrestrial Radio Access Network (E-UTRAN)", Stage 2, (Release 15), V15.1.0, Mar. 2018, Valbonne, France, 341 pages.
3GPP, 3GPP TS 23.501, Technical Specification Group Services and System Aspects, "System Architecture for the 5G System", Stage 2, (Release 15), V15.1.0, Mar. 2018, Valbonne, France, 201 pages.
3GPP, 3GPP TR 38.804, Technical Specification Group Radio Access Network, "Study on New Radio Access Technology", Radio Interface Protocol Aspects (Release 14), V14.0.0, Mar. 2017, Valbonne, France, 57 pages.

* cited by examiner

DYNAMIC BEARER VALIDITY

CROSS-REFERENCE TO RELATED APPLICATIONS

This application is a 35 U.S.C. § 371 national stage application for International Application No. PCT/EP2019/059299, entitled "DYNAMIC BEARER VALIDITY", filed on Apr. 11, 2019, which claims priority to U.S. Provisional Patent Application No. 62/658,883, filed on Apr. 17, 2018, the disclosures and contents of which are hereby incorporated by reference in their entireties.

RELATED APPLICATION

The present application claims the benefit of and priority to U.S. Provisional Patent Application No. 62/658,883, filed Apr. 17, 2018, entitled "DYNAMIC BEARER VALIDITY", the disclosure of which is hereby incorporated herein by reference in its entirety.

BACKGROUND

The present disclosure relates generally to communications, and more particularly, to wireless communications and related wireless devices and network nodes.

The delivery of a service in a cellular network is provided through the establishment of a connection that allows a user equipment connected to the network to send/receive data. To this end, the network provides some functionalities to guarantee a proper treatment of the traffic considering its quality of service (QoS) requirements. To identify a traffic and its QoS requirements and to fulfill such QoS requirements, 4G networks exploit evolved packet system (EPS) bearers, which are the concatenation of a radio bearer, an S1 bearer and an S5/S8 bearer. 5G systems exploit a different solution based on the definition of a PDU session, which is the concatenation of a radio bearer and a N3 tunnel. In the following discussion, the term "bearer" refers to an EPS bearer regardless of its constituent parts.

The delivery of a service in a cellular network is enabled by means of two procedures, i.e., bearer establishment and bearer modification. The network establishes a bearer, which uniquely identifies traffic flows that receive a common QoS treatment (e.g. maximum tolerate latency, priority, etc.) within the cellular network. The QoS parameters of the bearer are negotiated by means of several procedures (e.g., SLA-based, QoS mapping, negotiation with the applications, etc.) and such parameters are used for the duration of the data traffic. To enable adaptation of traffic delivery to react to network changes (e.g., increased load during the service delivery), a bearer modification procedure is used to update the QoS parameters related to the bearer. This procedure is triggered by the network when the QoS of the bearer cannot be supported anymore, and it is thus triggered on an event-basis.

SUMMARY

A method in an access network (200) including a radio access network (100) and a packet data network gateway (P-GW) includes receiving (702), at a network node (510) in the access network, a service setup request (615) from an external service via a packet switched data communication network (580), wherein the service setup request is to set up a packet switched connection between the external service and a wireless terminal (10) served by the radio access network, negotiating (704) a quality of service, QoS, level with the external service for the packet switched connection, wherein the QoS level includes a plurality of QoS parameters including a minimum QoS duration, and causing (706) the packet data network gateway to establish a bearer (410) between the packet data network gateway and the wireless terminal, the bearer having the QoS level.

A method performed by a packet data network gateway (P-GW) in an access network (200) including a radio access network (100) includes receiving (802) a bearer setup request, wherein the service setup request is to set up a bearer to a wireless terminal (10) served by the radio access network, wherein the bearer setup request specifies a quality of service (QoS) level for the bearer, wherein the QoS level includes a plurality of QoS parameters including a minimum QoS duration, and establishing (804) the bearer between the packet data network gateway and the wireless terminal, the bearer having the QoS level.

A method by a service (610) operating in an application server (590) includes sending (902), to a network node (510) in an access network (200) including a radio access network (100) and a packet data network gateway (P-GW), a service setup request (615) via a packet switched data communication network (580), wherein the service setup request is to set up a packet switched connection between the external service and a wireless terminal (10) served by the radio access network, and negotiating (904) a quality of service, QoS, level with the external service for the packet switched connection, wherein the QoS level includes a plurality of QoS parameters including a minimum QoS duration for a bearer (410) between the packet data network gateway and the wireless terminal, the bearer having the QoS level.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
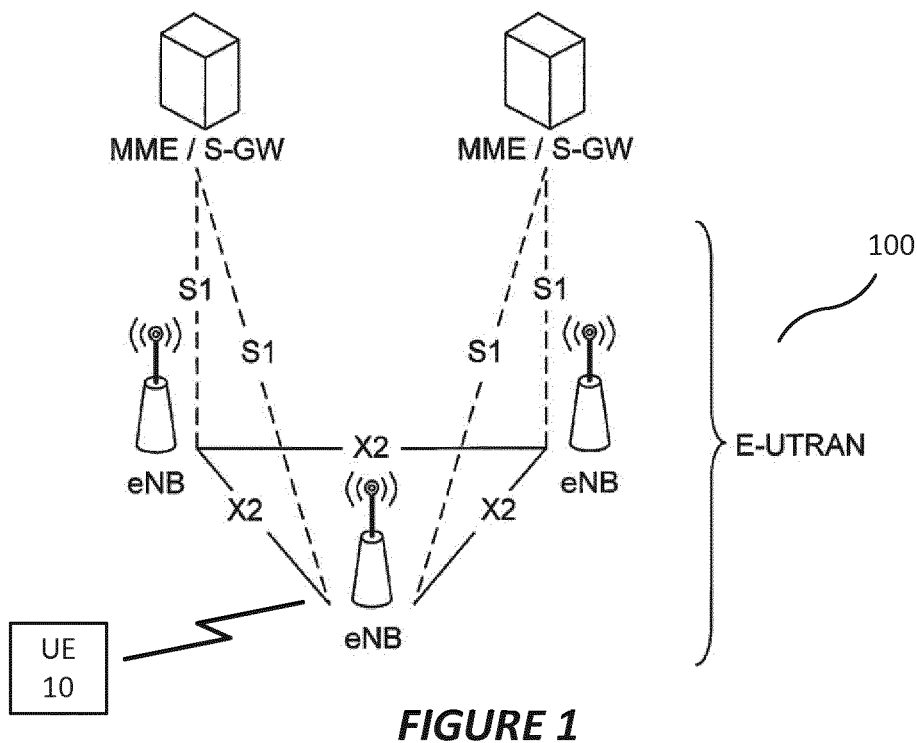
FIG. 1 is a block diagram of a radio access network in accordance with some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

For purposes of illustration and explanation only, these and other embodiments of present inventive concepts are described herein in the context of operating in a Radio Access Network (RAN) that communicates over radio communication channels with wireless terminals (also referred to as mobile terminals, or UEs). It will be understood, however, that present inventive concepts are not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from WCDMA and/or HSPA is used in this disclosure to exemplify embodiments of the inventive concepts, this should not be seen as limiting the scope of inventive concepts to only these systems. Other wireless systems, including 3GPP (3rd Generation Partnership Project) LTE (Long Term Evolution), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of inventive concepts may also be applied, for example, in an uplink. Furthermore, although the description below focuses, for purposes of illustration, on example embodiments in which described solutions are applied in heterogeneous networks that include a mix of relatively higher-power (e.g., "macro") base stations and relatively lower-power node (e.g., "pico") base stations, the described techniques may be applied in any suitable type of network, including both homogeneous and heterogeneous configurations. Thus, the base stations involved in the described configurations may be similar/identical to one another, or may differ in terms of transmission power, number of transmitter-receiver antennas, processing power, receiver and transmitter characteristics, and/or any other functional or physical capability.

FIG. 1 illustrates an example of a wireless access network 100 in the context of the Evolved UMTS Terrestrial Radio Access Network (E-UTRAN). E-UTRAN includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. The overall E-UTRAN architecture is illustrated in FIG. 1, indicating e.g. the S1 and X2 interfaces. It will be appreciated, however, that embodiments of the inventive concepts may be applied to other types of radio access networks.

Referring to FIG. 1, the eNB hosts functionalities such as Radio Resource Management (RRM), radio bearer control, admission control, header compression of user plane data towards serving gateway, and/or routing of user plane data towards the serving gateway. The MME is the control node that processes the signaling between the UE and the CN (core network). Significant functions of the MME are related to connection management and bearer management, which are handled via Non Access Stratum (NAS) protocols. The S-GW is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW) is the node responsible for UE IP address allocation, as well as Quality of Service (QoS) enforcement (as further discussed below).

Figure 2:
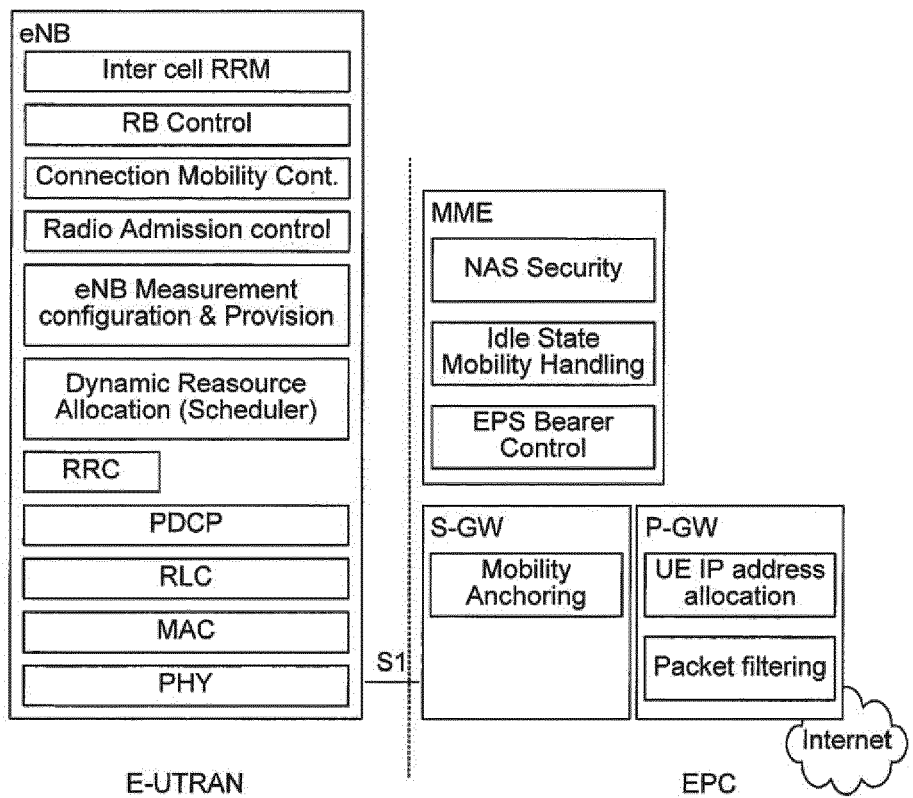
FIG. 2 is a block diagram illustrating aspects of an access network including a radio access network and an evolved packet core in accordance with some embodiments.

FIG. 2 illustrates a summary of functionalities of the different nodes. In FIG. 2, blocks eNB, MMe, S-GW, and P-GW illustrate logical nodes; blocks Inter Cell RRM, RB Control, Connection Mobility Cont., Radio Admission Control, eNB Measurement Configuration & Provision, Dynamic Resource Allocation (Scheduler), NAS Security, Idle State Mobility Handling, EPS bearer Control, Mobility Anchoring, UE IP address allocation, and Packet Filtering illustrate functional entities of the control plane; and blocks RRC, PDCP, RLC, MAC, and PHY illustrate the radio protocol layers.

Figure 3:
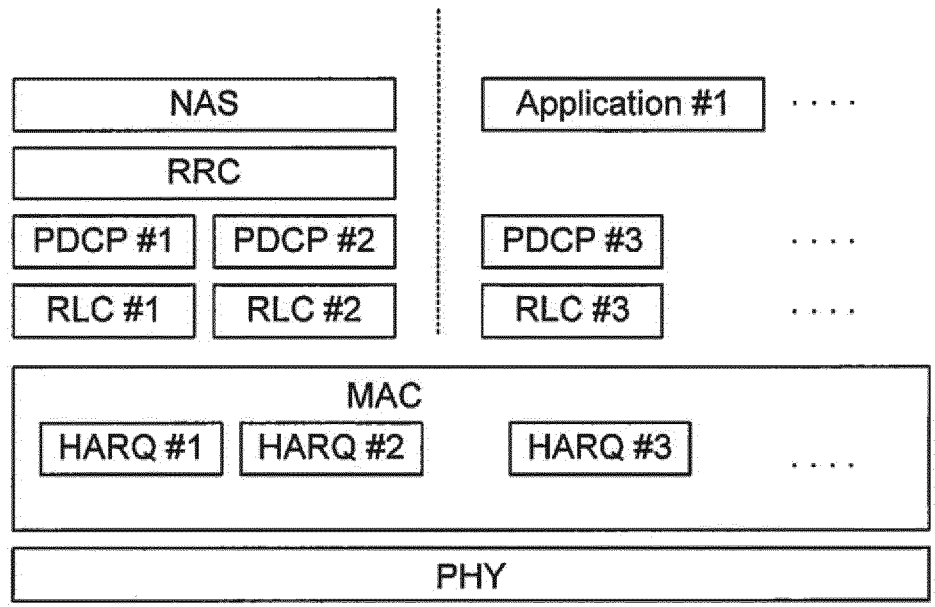
FIG. 3 is a block diagram illustrating layers of a communication node in accordance with some embodiments.

The radio protocol architecture of E-UTRAN is divided into the user plane and the control plane. FIG. 3 illustrates the protocol stack for the user-plane. The user plane protocol stack includes the Packet Data Convergence Protocol (PDCP), Radio Link Control (RLC), and Medium Access Control (MAC), which are terminated at the eNB. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS (Quality of Service) of each radio bearer and the current capacity available to the UE.

A UE can have multiple applications running at the same time, each having different QoS (Quality of Service) requirements (for example, VoIP, browsing, file download, etc.). To support these different requirements, different bearers are set up, each being associated with a respective QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g. scheduling policy, queue management policy, rate shaping policy, RLC configuration, etc.).

One EPS bearer/E-RAB is established when the UE connects to a PDN (Packet Data Network), and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer can either be a GBR or a Non-GBR bearer while a default bearer shall be a Non-GBR bearer.

Figure 4:
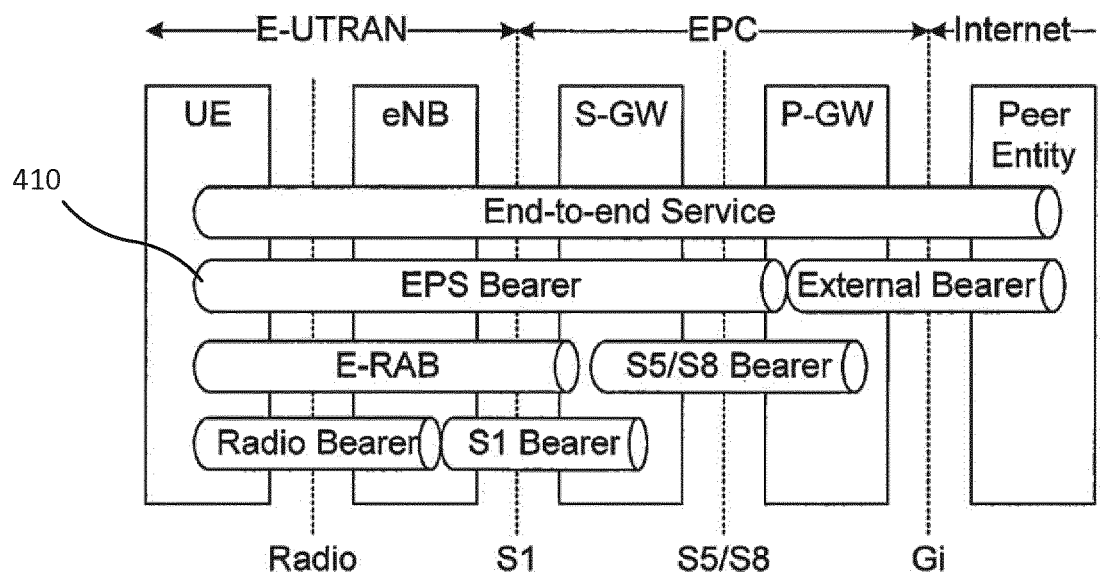
FIG. 4 is a block diagram illustrating various bearers used in an access network in accordance with some embodiments.

FIG. 4 illustrates the EPS bearer service architecture. An EPS bearer 410 extends between a UE and a packet data network gateway (P-GW). The packets of an EPS bearer are transported over a radio bearer between the UE and eNB. An S1 bearer transports the packets of an EPS bearer between the eNB and S-GW. An E-RAB is actually a concatenation of these two bearers (i.e., radio bearer and S1 bearer), and the two bearers are mapped on a one to one fashion. An S5/S8 bearer transports the packets of the EPS bearer between the S-GW and P-GW, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters:

QoS Class Identifier (QCI): scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the eNodeB. Nine QCI values are standardized the detailed requirements of these classes can be found in 3GPP TS 23.203.

Allocation and Retention Priority (ARP): the primary purpose of ARP is to decide whether a bearer establishment/modification request can be accepted or needs to be rejected in case of resource limitations. In addition, the ARP can be used by the eNodeB to decide which bearer(s) to drop during exceptional resource limitations (e.g. at handover).

Each GBR bearer may be additionally associated with the following bearer level QoS parameters:

Guaranteed Bit Rate (GBR): the bit rate that can be expected to be provided by a GBR bearer.

Maximum Bit Rate (MBR): the maximum bit rate that can be expected to be provided by a GBR bearer. MBR can be greater or equal to the GBR.

Each Access Point Name (APN) access, by a UE, is associated with a per-APN Aggregate Maximum Bit Rate (APN-AMBR). The APN-AMBR sets the limit on the aggregate bit rate that can be expected to be provided across all Non GBR bearers and across all PDN connections of the same APN.

Each UE in state EMM-REGISTERED is associated with the bearer aggregate level QoS parameter known as per UE Aggregate Maximum Bit Rate (UE-AMBR). The UE AMBR limits the aggregate bit rate that can be expected to be provided across all Non GBR bearers of a UE.

Figure 5:
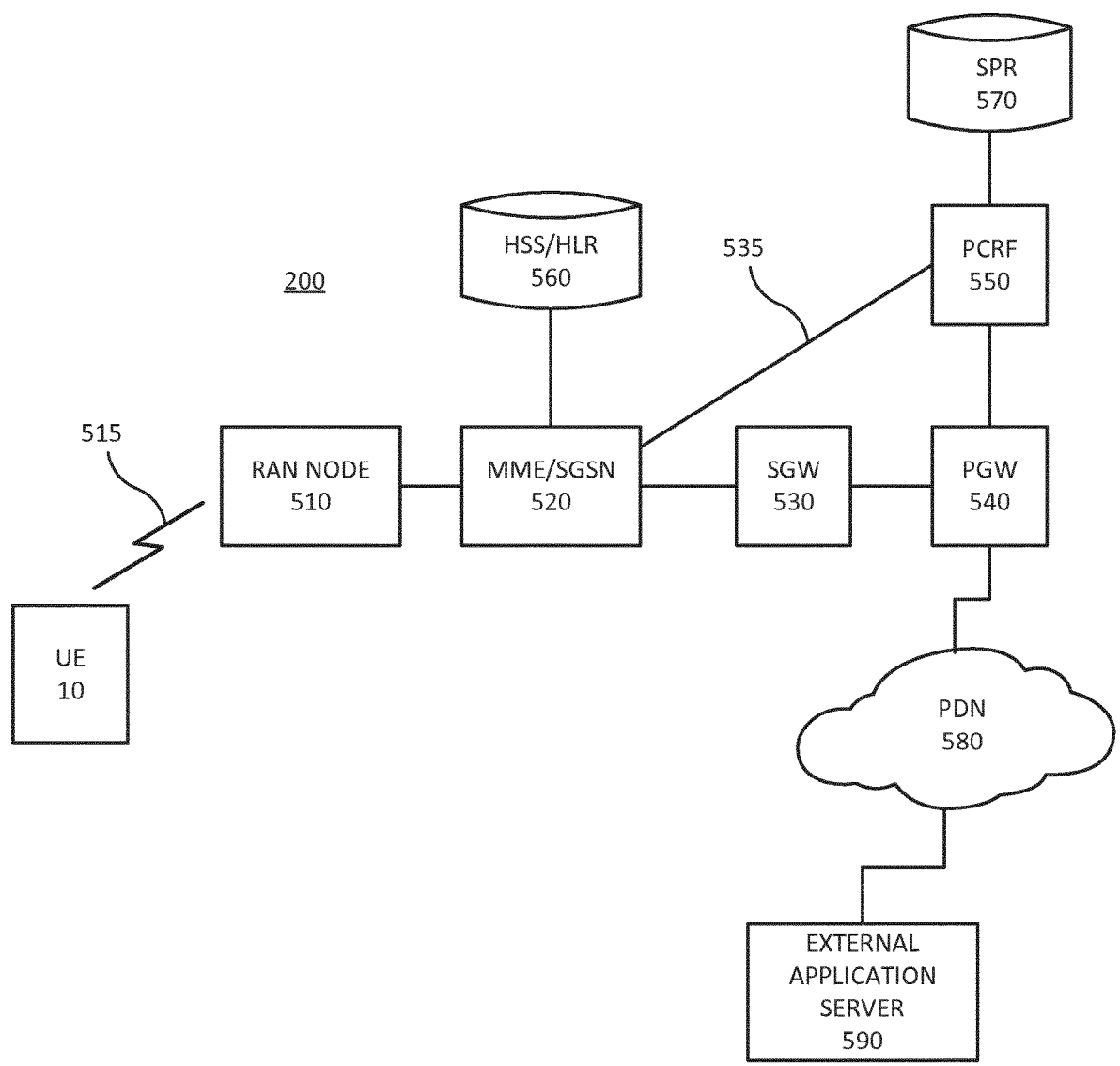
FIG. 5 is a block diagram illustrating components of an access network in accordance with some embodiments.

FIG. 5 depicts an access network 200 in which embodiments herein may be implemented. The radio access network 100 illustrated in FIG. 1 is a component of and included within the access network 200. The access network 200 may in some embodiments apply to one or more radio access technologies such as for example Long Term Evolution (LTE), LTE Advanced, Wideband Code Division Multiple Access (WCDMA), Global System for Mobile Communications (GSM), or any other 3GPP radio access technology, or other radio access technologies such as e.g. Wireless Local Area Network (WLAN).

The access network 200 includes a RAN node 510 such as an eNB, gNB, RNC, BSC or any other network unit capable to communicate over a radio carrier with a wireless device, such as a UE 10. The RAN node 510 may be an eNodeB in case of an LTE network, and a RNC in case of a WCDMA network, a BSC in case of a GERAN network, a gNodeB in the case of a 5G/New Radio (BR) network, etc.

The wireless device 10 may be a device by which a subscriber may access services offered by an operator's network and services outside operator's network to which the operator's radio access network and core network provide access, e.g. access to the Internet. The wireless device 10 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 305 may be portable, pocket storable, hand held, computer comprised, or vehicle mounted devices, enabled to communicate voice and/or data, via the radio access network, with another entity, such as another wireless device or a server.

The RAN node 510 is connected to a MME/SGSN 520. The MME/SGSN 520 may be a MME, a S4-SGSN, a Gn/Gp-SGSN or a co-located MME/SGSN node. The MME/SGSN 520 is connected to a HSS/HLR 560. The HSS/HLR 560 may be a HSS when the MME/SGSN 520 is a MME or a S4-SGSN. The HSS/HLR 560 may be a HLR when the MME/SGSN 520 is a Gn-SGSN. The MME/SGSN 520 is further connected to a Serving GateWay (S-GW) 530 and the SGW 530 is connected to a P-GW 540. The S-GW 530 is the gateway which terminates the user plane interface towards the radio access network. The wireless device 10 is associated with one S-GW 530. The SGW 530 is responsible for data transfer in terms of all packets across the user plane. The P-GW 540 is the gateway which terminates the interface towards packet data network (PDN) 580. If the wireless device 10 is accessing multiple PDNs, there may be more than one P-GW 540 for that wireless device 10. The P-GW 540 handles mobility between 3GPP and non-3GPP technologies and provides connectivity from the wireless device 10 to the external PDN 580.

The MME/SGSN 520 has a direct interface 535 towards a policy and charging rules function (PCRF) node 550. The P-GW 540 is also connected to the PCRF node 550. The PCRF node 550 is connected to a Subscriber Profile Repository (SPR) 570. SPR 570 is a database comprising subscriber and subscription related information which is needed by the PCRF node 550 to perform service- and subscription-based policies. Information about the QoS requirements of a particular service and/or user may be stored in the SPR 570 and accessed by the PCRF during service setup/modification negotiations as described herein.

An external application server 590, which is not part of the access network 200, may communicate with the wireless terminal 10 and/or one or more nodes of the access network 200 through the PDN 580.

Figure 6A:
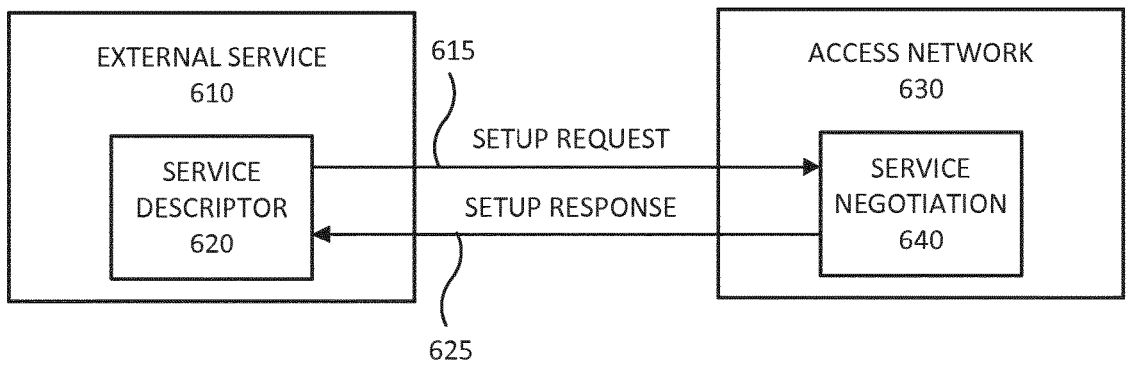
FIG. 6A is a block diagram illustrating setup of an external service in accordance with some embodiments.
Figure 6B:
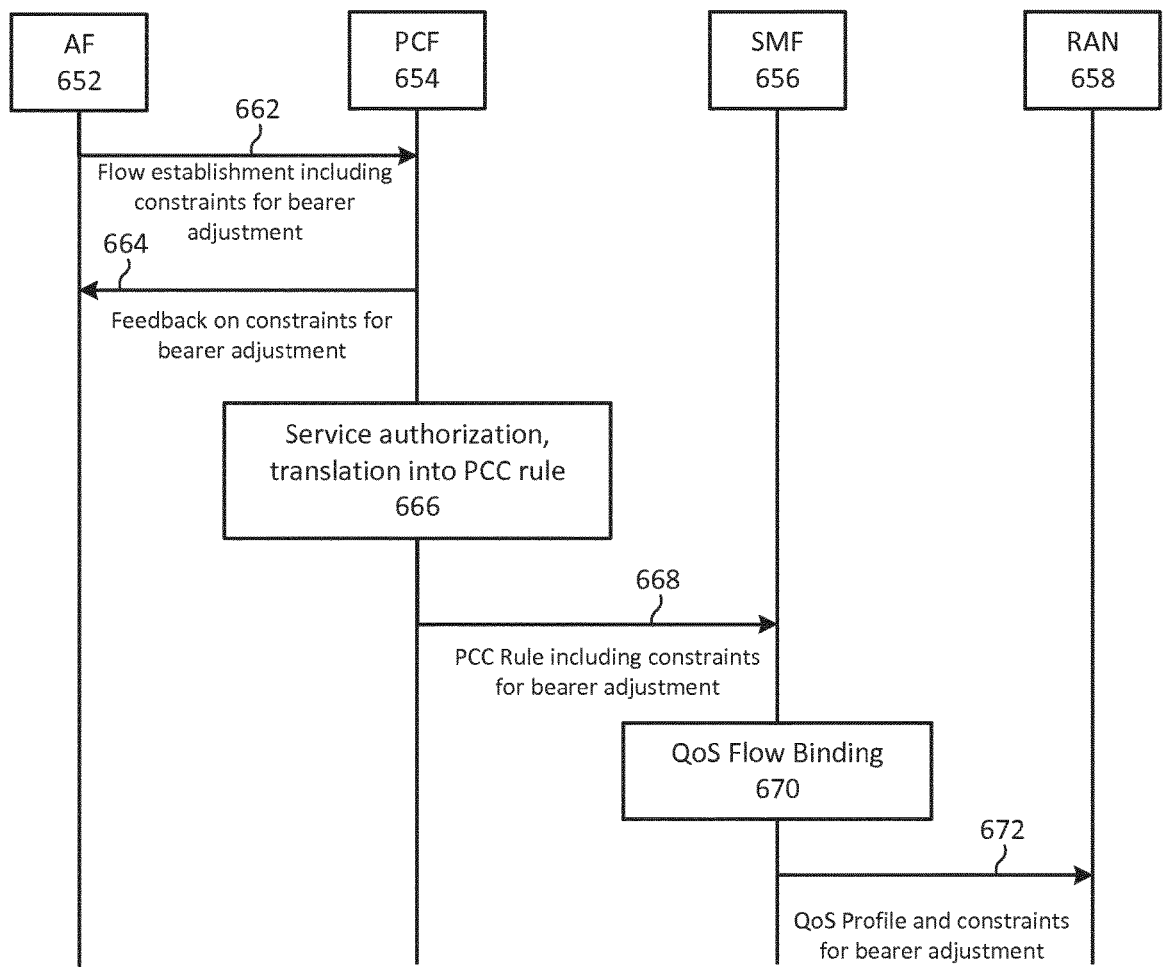
FIG. 6B is a flow diagram illustrating setup of an external service in accordance with some embodiments.

FIG. 6A illustrates the setup of a connection from an external service 610 to a wireless terminal 10 in the access network 200. The external service 610 may be provided by the external application server 590. The external service 610 includes a service descriptor function 620 that has knowledge of the service requirements of the service, including QoS requirements of the service, and is responsible for setting up service connections through the access network 200 with a node, such as a wireless terminal 10. The access network 200 includes a service negotiation function 640 which negotiates parameters, such as QoS parameters, of a connection requested by an external service, and which may be provided, for example, by a PCRF node 550, a P-GW 540, an S-GW 530, an MME/SGSN node 520 or any other network node.

To establish and/or modify a service connection with a wireless terminal 10, the external service 610 may engage in a service setup negotiation with the access network 200 in which the external service sends one or more service setup requests 615 to the service negotiation function 640, and the service negotiation function 640 responds with one or more service setup responses 625. The result of the negotiation is the establishment, or re-establishment, of a data communication connection between the external service 610 and a wireless terminal 10 served by the access network 200, wherein the data communication connection has an agreed set of parameters, such as an agreed QoS level.

Figure 10:
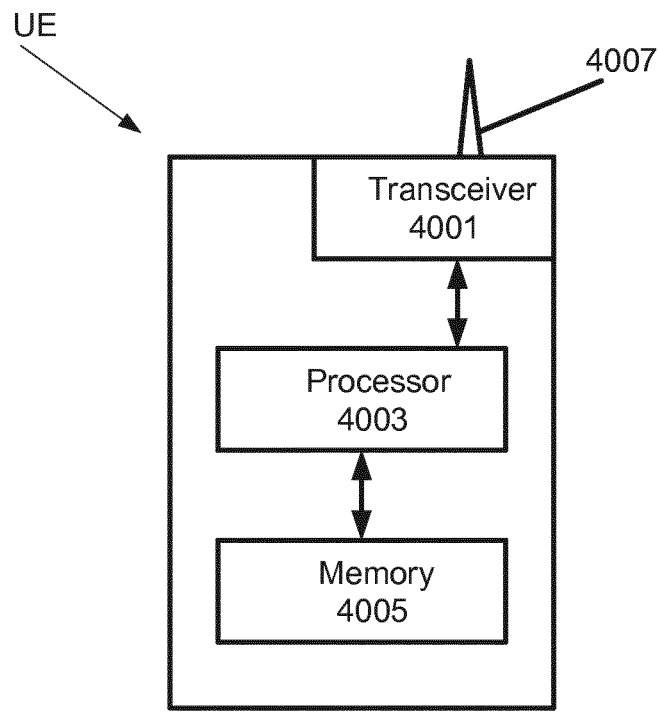
FIG. 10 is a block diagram illustrating a wireless terminal in accordance with some embodiments.

FIG. 10 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 4007, and a transceiver circuit 4001 (also referred to as a transceiver) including a transmitter and a receiver configured to provide uplink and downlink radio communications with a base station eNB of a wireless communication network (also referred to as a radio access network RAN). Wireless device UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless device UE may also include an interface (such as a user interface) coupled with processor 4003, and/or wireless device UE may be an IoT and/or MTC device.

As discussed herein, operations of wireless device UE may be performed by processor 4003 and/or transceiver 4001. For example, processor 4003 may control transceiver 4001 to transmit uplink communications through transceiver 4001 over a radio interface to a base station eNB of a wireless communication network and/or to receive downlink communications through transceiver 4001 from a base station eNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 11:
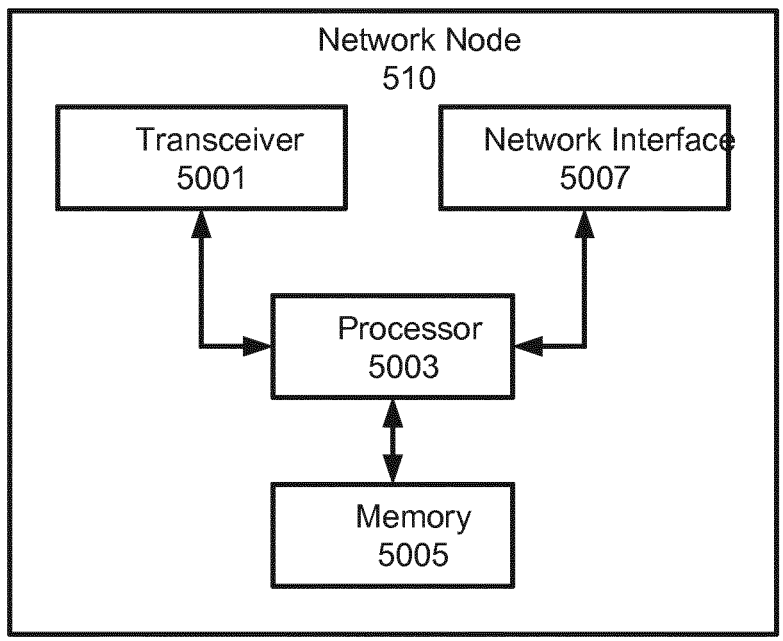
FIG. 11 is a block diagram illustrating a network node in accordance with some embodiments.

FIG. 11 is a block diagram illustrating elements of a node (also referred to as a network node, base station, eNB, eNodeB, etc.) of a wireless communication network (also referred to as a Radio Access Network RAN) configured to provide cellular communication according to embodiments of inventive concepts. As shown, the network node may include a transceiver circuit 5001 (also referred to as a transceiver) including a transmitter and a receiver configured to provide uplink and downlink radio communications with wireless devices. The network node may include a network interface circuit 5007 (also referred to as a network interface) configured to provide communications with other nodes (e.g., with other base stations and/or core network nodes) of the RAN. The network node may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the network node may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments).

Figure 12:
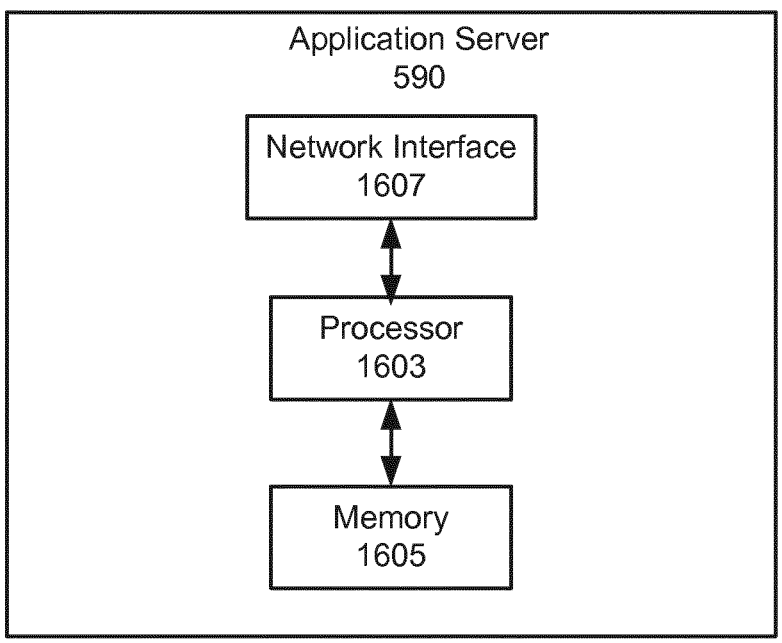
FIG. 12 is a block diagram illustrating an application server in accordance with some embodiments.

FIG. 12 is a block diagram illustrating elements of an application server 590 that communicates through a packet data network with nodes in a wireless communication network. As shown, the application server 590 may include a network interface circuit 1607 (also referred to as a network interface) configured to provide communications with other nodes (e.g., with wireless terminals, base stations and/or core network nodes) of the RAN. The application server 590 may also include a processor circuit 1603 (also referred to as a processor) coupled to the transceiver circuit, and a memory circuit 1605 (also referred to as memory) coupled to the processor circuit. The memory circuit 1605 may include computer readable program code that when executed by the processor circuit 1603 causes the processor circuit to perform operations according to embodiments disclosed herein. According to other embodiments, processor circuit 1603 may be defined to include memory so that a separate memory circuit is not required.

As discussed herein, operations of the application server 590 may be performed by processor 1603 and/or network interface 1607. For example, processor 1603 may execute one or more application programs that provide services to a wireless terminal in the RAN. The processor 1603 may the control network interface 1607 to transmit communications through network interface 1607 to one or more other network nodes and/or to receive communications through network interface from one or more other network nodes. Moreover, modules may be stored in memory 1605, and these modules may provide instructions so that when instructions of a module are executed by processor 1603, processor 1603 performs respective operations (e.g., operations discussed below with respect to Example Embodiments).

Existing solutions for setting up a service connection between an external service and a wireless terminal through an access network are mainly based on the assumption that an event-based bearer adaptation (e.g., adapting the bearer to react to an increased load in the network with consequent reduced availability of radio resources or higher latency) would bring an improvement in the QoS experienced by the receivers of a certain service. Even if this assumption is reasonable for media applications where the QoS supported by the network impacts the way the service is delivered (e.g., data rate, video resolution, etc.), this approach might be too simplistic for services where the QoS supported by the network in a certain time or zone might impact the content or behavior of the service instead of the data delivery, especially for applications with safety relevance, such as a service for remote driving vehicles where the speed of the vehicle could depend on the latency of data transmissions. For example, it may be necessary to temporarily reduce the vehicle speed before changing QoS parameters of the bearer to safely control the vehicle and then adapt the speed of the vehicle to the new QoS of the bearer.

The inventive concepts described herein provide a new approach for bearer establishment and modification, enabling an external service to be aware of how long the QoS parameters associated to a certain bearer are going to last before a potential change to the bearer QoS will occur. In addition, the inventive concepts allow the network to be aware of an upcoming bearer modification, thus potentially enhancing the bearer adaptation thanks to the availability in advance of such information. For example, some embodiments may provide a more effective and stable selection of QoS parameters reflecting the status of the network.

The knowledge of a minimum time window over which a QoS provision is expected to be fulfilled for a certain bearer may allow the network to enhance its ability to determine, for example, whether or not a demanding service can be provided. In addition, the knowledge about an upcoming bearer modification may allow the network to exploit more effective tools (e.g., machine learning, etc.) in order to know in advance which QoS can be effectively supported in the next time window of the bearer. Together, these aspects may enable the network to provide a service with potentially more reliable information about the expected QoS capabilities, as well as to deliver a more aggressive capability.

From the service side, the knowledge about the time window in which QoS parameters will be valid allows the service to optimize its behavior. For example, in the context of a remote driving application, knowledge of the time for which a QoS will be valid may allow the service to remotely drive a vehicle at a stable speed, thus avoiding unplanned speed changes which might impact fuel savings, comfort and/or safety.

In this description, the term "service" refers to an application that transfers data via a network to a node served by the network. The service may be associated to one or more applications with predetermined delivery requirements that might need to be fulfilled during the duration of the service in order to successfully deliver the service.

The term "network" includes a communication infrastructure between two nodes, including cellular networks and sidelink (ad-hoc) communication links, for example. As described above, the term "bearer" refers to a solution adopted by a cellular network to identify traffic with related QoS requirements and to fulfill such QoS requirements of the traffic. According to terminology used in 4G networks, such solution is represented by the EPS bearer, which is the concatenation of a radio bearer, S1 bearer and S5/S8 bearer. According to 5G systems terminology, such solution is represented by the PDU session, which is the concatenation of a radio bearer and a N3 tunnel. The bearer is established through a "bearer establishment" procedure when the communication between the two nodes is triggered and the characteristics of the bearers might be changed by means of a "bearer modification" procedure.

In current systems, a bearer is established statically by the network, and the network has the ability to unilaterally change the QoS of the bearer or to simply drop the bearer. An illustrative example is a VoIP bearer that has stable requirements over time, with no need for frequent adaptations. Another example is a video bearers over which media can be delivered with different resolutions and network requirements. In this case, the network can adjust the bearer parameters unilaterally based on the level of service that can be delivered at a given time.

Upcoming services, such as in the connected vehicles area, may have demanding QoS requirements, which the network is unlikely to be able to deliver at all times. Thus, there is expected to be an increased need for dynamic bearer QoS renegotiation. It is also observed that some of these demanding services may benefit in terms of safety, comfort and efficiency if the bearer renegotiations could be limited in frequency. This is because, for example, adaptation of the driving behavior of a vehicle incurs in latencies due to the mechanical nature of the vehicles, a limitation not relevant for other types of data traffic, such as media delivery, that has typically used guaranteed bearers to this point in time.

In order to tackle the above considerations, the inventive concepts provide a new negotiation between the network and the service (i.e., an application/platform providing the service) concerning time constraints for bearer adjustment. For example, the service may request that the QoS of a bearer not be adjusted within a certain time window or beyond a certain adjustment frequency. Additional conditions for bearer adjustment can be provided, such as a linkage between the time constraints for bearer adjustment, the type of bearer, and the type of adjustment. For example, a frequent adaptation may be allowed only for improvements to QoS but not to reduce the QoS level of the bearer.

Examples of possible constraints for bearer adjustment include preferred windows for adjustments, frequency of adjustments, minimum bearer duration, and exceptions. Each of these possible constraints is discussed below.

Preferred windows for adjustments: the constraint may include a time window (e.g., starting and ending points) or space window (e.g., a geographical area) indicated by the service during which the service can tolerate bearer adjustments, if any. Alternatively or additionally, the service may indicate one or more time/space windows in which adjustments may not happen or are preferred not to happen. This reflects cases when, for instance, the service involves a remotely controlled vehicle which may tolerate bearer adjustment while driving in the countryside but it would be preferred to avoid bearer adjustment when for instance merging to an highway to guarantee a stable QoS during the merging.

Frequency of adjustments: the constraint may includes a permissible frequency of bearer adjustments within a defined time window. The time window may be pre-defined or communicated along with the constraint. As an example, the service can communicate that it accepts bearer adjustments with a maximum frequency of 5 changes every one hour. This reflects cases when, for instance, the service involves a remote control of a platoon of vehicles, where QoS adaptation involves driving behavior adaptations (e.g., slowing down vehicles of the platoon, increase inter-platoon member distance) which involve higher fuel consumption. In that case, the frequency of adaptations should be kept low.

Minimum bearer duration: the service may communicate time interval (e.g., one minute) that defines a minimum duration for the configuration. For example, a bearer could be modified only if the new bearer configuration is expected to be kept for a time interval at least as long as the indicated interval (e.g., the bearer configuration should last at least one minute). This reflects cases when, for example, a bearer adjustment involves driving behavior adjustments (change of speed, change of trajectory, etc.) which take time to be completed. In that case it is desirable for the service to trigger an adjustment only if the new configuration is expected to be valid at least for the time needed to complete the driving behavior adjustment.

Exceptions: the service may communicate exceptions to the constraints. For example, the service may inform the network about a condition (or a set of conditions) that, if it happens or is expected to happen, the service expects to trigger a bearer adjustment even if this violates the minimum bearer duration (or others constraints for bearer adjustment). For example, if the exception indicates that the bearer should be adjusted if, for example, the latency is expected to be higher than 50% compared to current (or last negotiated) packet delay budget, then the network is aware that the bearer adjustment can happen even if the latency increase is expected to last less than the minimum bearer duration. This reflects the case when the service has some safety profiles which are triggered in some particular circumstances (e.g., severe QoS drops), and in this case the exceptions have priority compared to others bearer adjustment constraints.

A bearer adjustment is typically triggered by the network, which is subject to the negotiated constraints. However, it may also be possible to support a reciprocal framework where the network imposes constraints on the service as to how frequently a certain bearer QoS can be modified. This may allow the network to better plan its resources and provide an improved service.

In some embodiments, the negotiation between the service and the network may be explicit (via any form of signaling and configuration) or implicit (via a predefined service level agreement).

FIG. 6A illustrates an example of a bearer negotiation during a flow establishment in a 5G system. The example in FIG. 6A indicates how the constraints for bearer adjustment are propagated to the involved network functions. As shown in FIG. 6A, the negotiation may take place between an Application Function (AF) 652 and a Policy Control Function (PCF) 654, potentially via a Network Exposure Function (NEF) in case of untrusted AFs. FIG. 1 depicts how the AF 652 and the PCF 654 interact, and how the constraints for bearer adjustment are propagated to involved network functions, including the session management function (SMF) 656 and radio access network (RAN) 658. The AF 652 sends a flow establishment message 662 to the PCF 654 including constraints for bearer adjustment. the PCF 654 provides feedback 664 to the AF 652 on the constraints for bearer adjustments. The feedback may indicate the acceptance of constraints indicated by the AF or could contain a counterproposal from the PCF 654 containing alternative constraints.

Following this negotiation, the PCF 654 performs service authorization and translation of the constraints into a policy and charging control (PCC) rule (comprising 5QI, ARP, GBR/MBR, PL, notification control, etc.) (block 666). The PCF 654 sends the PCC rule including the constraints to the SMF 656, which performs QoS flow binding (block 670). The SMF 656 then sends the QoS profile including constraints for bearer adjustment to the RAN 658.

The information about the constraints for bearer adjustments could be used by the SMF 656 and/or the RAN 658 as follows:

Preferred windows for adjustments: if the SMF/RAN expects that the current QoS Flow cannot be fulfilled, but the service is delivered in a time/space window where adjustments are expected not to happen, the SMF/RAN can temporarily increase the service priority to avoid triggering a bearer adjustment, thereby fulfilling the constraint of avoiding bearer adjustments in that specific time/space window.

Frequency of adjustments: if the bearer adjustments have already reached the maximum frequency (e.g., 5 adjustments in 1 hour), the SMF/RAN can temporarily increase the service priority to avoid triggering another bearer adjustment and avoid violating the constraint on the frequency of adjustments. According to the frequency of adjustments, the PCF 654 can derive tags to be added to the PCC rule (for SMF) and to the QoS Profile (for RAN) that represent limitations in the number of session de-activations or re-negotiations.

Minimum bearer duration: when deciding whether to trigger a bearer adjustment, the PCF/SMF/RAN can compute whether the adjustment is expected to be kept for a time interval at least equal to the minimum bearer duration. In that case, the network may compute how long the changes in the bearer configuration are expected to be kept.

Exceptions: the PCF/SMF/RAN may monitor whether the conditions indicated in the exceptions are met, and may trigger a bearer adjustment if such conditions occur even if the adjustment violates one or more other bearer adjustment constraints.

In further embodiments, the network may, in specific cases, violate the negotiated constraints or use exceptions to the negotiated QoS service. The conditions for violating the negotiated QoS renegotiation constraints can also be part of a negotiated agreement. For example, the network may be allowed to make occasional exceptions to the negotiated constraints, as long as such exceptions do not exceed certain frequency or other constraints. The network may inform the service in case the negotiated constraints cannot be respected anymore and, e.g., a bearer needs to be adjusted before its minimum duration timer expires.

Once the bearer QoS and minimum duration are negotiated, the network is expected to consistently deliver the expected QoS at least over the minimum bearer duration. This is different from current QoS frameworks where the QoS can be adjusted at any time unilaterally by the network.

In order to enable the above framework, different signaling can be used by any combination of the following options:

In some embodiments, the inventive concepts provide a new parameter to the bearer establishment procedure that indicates a time window of validity of the QoS parameters negotiated between the service and the network during the bearer establishment. This parameter refers to the time validity of negotiated QoS parameters, and not to the bearer activity timer (i.e., the timer used by the network to check for how long a bearer has not been used for data transmission before deciding to release the bearer).

In some embodiments, the time window of QoS validity of the bearer (e.g., the minimum bearer duration) is negotiated between the service and the network. As an example, the service may indicate a preferred value or list of values of QoS validity time windows, which may be derived according to the needs of the service (e.g., short time windows for dynamic adaptations or longer time windows for long-term service adaptation). In a further example, the network may indicate a value or a list of values of QoS validity time windows, which could be derived according to the network status (current load in a certain area, etc.) as well as to network capabilities in estimating upcoming QoS capabilities for the bearer to be established.

In some embodiments, the time window of QoS validity of the bearer may be re-negotiated during a bearer modification procedure. In one example, the service may indicate a different value or list of values of QoS validity time windows due to a different application behavior or context (for instance, when a remotely driven vehicle is approaching an intersection, the service may require a different QoS validity window compared to when the vehicle was on a highway. In another example, the network may indicate a different value or list of values of QoS validity time windows due to changes in the load of the network in the new geographical area where the receiver is located.

Operations of a network node according to some embodiments now be discussed with reference to the flow chart of FIG. 7 according to some embodiments of inventive concepts. For example, modules may be stored in network node memory 5005 of FIG. 11, and these modules may provide instructions so that when the instructions of a module are executed by wireless device processor 5003, processor 5003 performs respective operations of the flow chart of FIG. 7.

Figure 7:
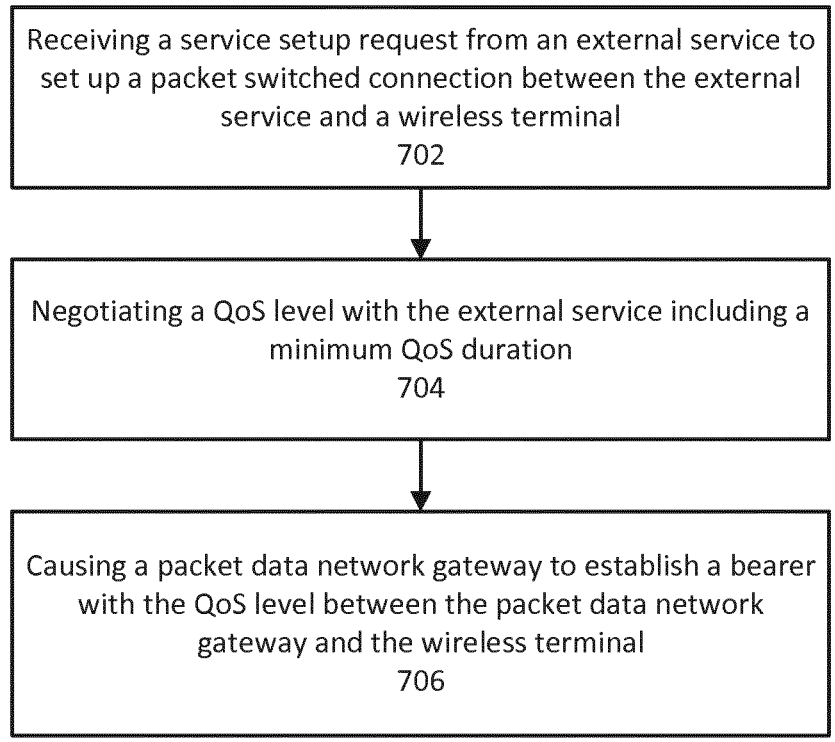
FIGS. 7, 8 and 9 are flowcharts illustrating operations of systems/methods in accordance with some embodiments.

Referring to FIG. 7, A method in an access network 200 including a radio access network 100 and a packet data network gateway P-GW includes receiving 702, at a network node 510 in the access network, a service setup request 615 from an external service via a packet switched data communication network 580, wherein the service setup request is to set up a packet switched connection between the external service and a wireless terminal 10 served by the radio access network, negotiating 704 a quality of service, QoS, level with the external service for the packet switched connection, wherein the QoS level includes a plurality of QoS parameters including a minimum QoS duration, and causing 706 the packet data network gateway to establish a bearer 410 between the packet data network gateway and the wireless terminal, the bearer having the QoS level.

The method may further include maintaining the bearer with at least the QoS level for at least the minimum QoS duration.

The method may further include setting a duration of a bearer activity timer associated with the bearer to be equal to or greater than the minimum QoS duration.

The method may further include renegotiating the QoS level with the external service upon expiration of the bearer activity timer.

The method may further include renegotiating the QoS level with the external service upon expiration of the minimum QoS duration.

In some embodiments, the external service provides a list of acceptable values of minimum QoS duration to the network node, and the network node selects the minimum QoS duration from the list of acceptable values of minimum QoS duration.

In some embodiments, the network node provides a list of acceptable values of minimum QoS duration to the external service, and the external service selects the minimum QoS duration from the list of acceptable values of minimum QoS duration.

In some embodiments, the network node includes a policy and charging rules function, PRCF, in the access network.

The method may further include detecting a change in network conditions affecting the wireless terminal, and renegotiating the QoS level including the minimum QoS duration with the external service in response to detecting the change in network conditions.

The method may further include renegotiating the QoS level including the minimum QoS duration with the external service in response to a request from the external service to renegotiate the QoS.

In some embodiments, the access network attempts to maintain a quality of the packet switched connection at least at the QoS level during the minimum QoS duration.

In some embodiments, the bearer includes an evolved packet system, EPS, bearer including radio, S1, S5/S8 bearers.

In some embodiments, the minimum QoS level is set according to a QoS required by the external service.

The method may further include sending a notification to the external service in response to determining that the QoS level cannot be maintained for at least the minimum QoS duration.

In some embodiments, the negotiated QoS level allows for exceptions to at least one of the QoS parameters.

In some embodiments, the negotiated QoS level provides different minimum QoS durations for different types of bearers.

Operations of a packet data network gateway, P-GW, will now be discussed with reference to the flow chart of FIG. 8. For example, modules may be stored in a memory 5005 of FIG. 11, and these modules may provide instructions so that when the instructions of a module are executed by processor 5003, processor 5003 performs respective operations of the flow chart of FIG. 8.

Figure 8:
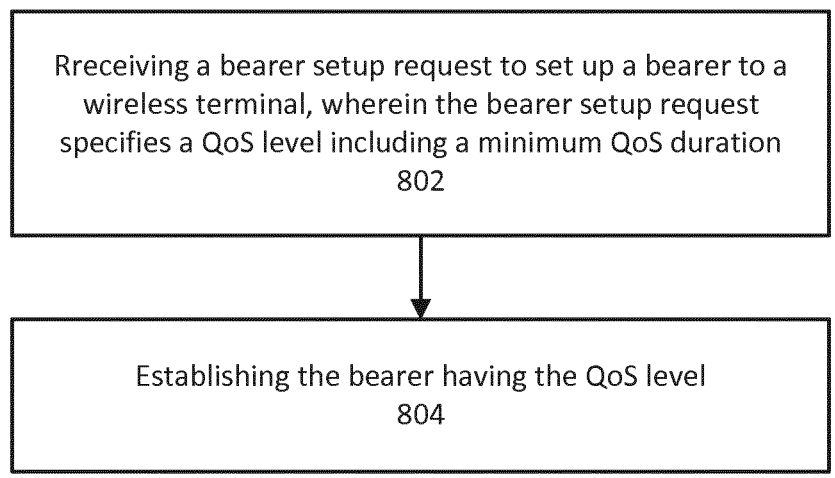

Referring to FIG. 8, A method performed by a packet data network gateway P-GW in an access network 200 including a radio access network 100 includes receiving 802 a bearer setup request, wherein the service setup request is to set up a bearer to a wireless terminal 10 served by the radio access network, wherein the bearer setup request specifies a quality of service QoS level for the bearer, wherein the QoS level includes a plurality of QoS parameters including a minimum QoS duration, and establishing 804 the bearer between the packet data network gateway and the wireless terminal, the bearer having the QoS level.

The method may further include maintaining the bearer with at least the QoS level for at least the minimum QoS duration.

The method may further include setting a duration of a bearer activity timer associated with the bearer to be greater than the minimum QoS duration.

In some embodiments, the bearer setup request is received from a policy and charging rules function, PRCF, in the access network.

Operations of an application server 590 will now be discussed with reference to the flow chart of FIG. 9. For example, modules may be stored in a memory 1605 of FIG. 12, and these modules may provide instructions so that when the instructions of a module are executed by processor 1603, processor 1603 performs respective operations of the flow chart of FIG. 9.

Figure 9:
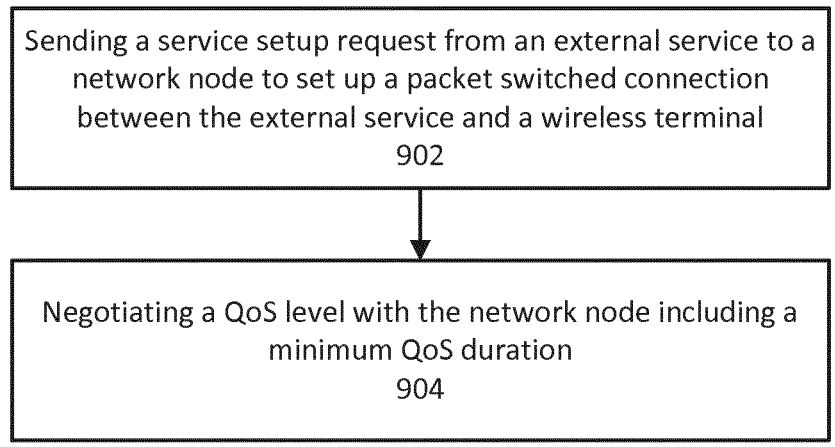

Referring to FIG. 9, a method by a service 610 operating in an application server 590 includes sending 902, to a network node 510 in an access network 200 including a radio access network 100 and a packet data network gateway P-GW, a service setup request 615 via a packet switched data communication network 580, wherein the service setup request is to set up a packet switched connection between the external service and a wireless terminal 10 served by the radio access network, and negotiating 904 a quality of service, QoS, level with the external service for the packet switched connection, wherein the QoS level includes a plurality of QoS parameters including a minimum QoS duration for a bearer 410 between the packet data network gateway and the wireless terminal, the bearer having the QoS level.

In some embodiments, the external service provides a list of acceptable values of minimum QoS duration to the network node, and the network node selects the minimum QoS duration from the list of acceptable values of minimum QoS duration.

In some embodiments, the network node provides a list of acceptable values of minimum QoS duration to the external service, and the external service selects the minimum QoS duration from the list of acceptable values of minimum QoS duration.

In some embodiments, the network node includes a policy and charging rules function, PRCF, in the access network.

In some embodiments, the bearer includes an evolved packet system, EPS, bearer.

In some embodiments, the minimum QoS level is set according to a QoS required by the external service.

In some embodiments, the minimum QoS level may be maintained for at least the minimum QoS duration.

In some embodiments, the negotiated QoS level allows for exceptions to at least one of the QoS parameters.

In some embodiments, the negotiated QoS level provides different minimum QoS durations for different types of bearers.

Example embodiments of inventive concepts are set forth below.

Embodiment 1. A method in an access network (200) including a radio access network (100) and a packet data network gateway (P-GW), the method comprising:

receiving (702), at a network node (510) in the access network, a service setup request (615) from an external service via a packet switched data communication network (580), wherein the service setup request is to set up a packet switched connection between the external service and a wireless terminal (10) served by the radio access network;

negotiating (704) a quality of service, QoS, level with the external service for the packet switched connection, wherein the QoS level comprises a plurality of QoS parameters including a minimum QoS duration; and causing (706) the packet data network gateway to establish a bearer (410) between the packet data network gateway and the wireless terminal, the bearer having the QoS level.

Embodiment 2. A method according to Embodiment 1, further comprising:
maintaining the bearer with at least the QoS level for at least the minimum QoS duration.

Embodiment 3. A method according to Embodiment 1 or 2, further comprising:
setting a duration of a bearer activity timer associated with the bearer to be equal to or greater than the minimum QoS duration.

Embodiment 4. A method according to Embodiment 3, further comprising:
renegotiating the QoS level with the external service upon expiration of the bearer activity timer.

Embodiment 5. A method according to any previous Embodiment, further comprising:
renegotiating the QoS level with the external service upon expiration of the minimum QoS duration.

Embodiment 6. A method according to any previous Embodiment, wherein the external service provides a list of acceptable values of minimum QoS duration to the network node, and the network node selects the minimum QoS duration from the list of acceptable values of minimum QoS duration.

Embodiment 7. A method according to any of Embodiments 1 to 5, wherein the network node provides a list of acceptable values of minimum QoS duration to the external service, and the external service selects the minimum QoS duration from the list of acceptable values of minimum QoS duration.

Embodiment 8. A method according to any previous Embodiment, wherein the network node comprises a policy and charging rules function, PRCF, in the access network.

Embodiment 9. A method according to Embodiment 1, further comprising:
detecting a change in network conditions affecting the wireless terminal; and
renegotiating the QoS level including the minimum QoS duration with the external service in response to detecting the change in network conditions.

Embodiment 10. A method according to Embodiment 1, further comprising:
renegotiating the QoS level including the minimum QoS duration with the external service in response to a request from the external service to renegotiate the QoS.

Embodiment 11. A method according to any previous Embodiment, wherein the access network attempts to maintain a quality of the packet switched connection at least at the QoS level during the minimum QoS duration.

Embodiment 12. A method according to any previous Embodiment, wherein the bearer comprises one or more of an evolved packet system, EPS, bearer, and related radio, S1, S5/S8 bearers composing the EPS bearer.

Embodiment 13. A method according to any previous Embodiment, wherein the minimum QoS level is set according to a QoS required by the external service.

Embodiment 14. A method according to any previous Embodiment, further comprising:
sending a notification to the external service in response to determining that the QoS level cannot be maintained for at least the minimum QoS duration.

Embodiment 15. A method according to any previous Embodiment, wherein the negotiated QoS level allows for exceptions to at least one of the QoS parameters.

Embodiment 16. A method according to any previous Embodiment, wherein the negotiated QoS level provides different minimum QoS durations for different types of bearers.

Embodiment 17. A network node (510) of an access network (200) including a radio access network (100) and a packet data network gateway (P-GW), the network node comprising:
a transceiver (5001) configured to provide communications with the packet data network gateway; and
a processor (5003) coupled to the transceiver and configured to provide network communication through the transceiver, wherein the processor is configured to perform operations according to any of Embodiments 1 to 16.

Embodiment 18. A network node (510) of an access network (200) including a radio access network and a packet data network gateway, wherein the network node is adapted to perform operations according to any of Embodiments 1 to 16.

Embodiment 19. A method performed by a packet data network gateway (P-GW) in an access network (200) including a radio access network (100), the method comprising:
receiving (802) a bearer setup request, wherein the service setup request is to set up a bearer to a wireless terminal (10) served by the radio access network, wherein the bearer setup request specifies a quality of service (QoS) level for the bearer, wherein the QoS level comprises a plurality of QoS parameters including a minimum QoS duration; and
establishing (804) the bearer between the packet data network gateway and the wireless terminal, the bearer having the QoS level.

Embodiment 20. A method according to Embodiment 19, further comprising:
maintaining the bearer with at least the QoS level for at least the minimum QoS duration.

Embodiment 21. A method according to Embodiment 19, further comprising:
setting a duration of a bearer activity timer associated with the bearer to be greater than the minimum QoS duration.

Embodiment 22. A method according to Embodiment 19, wherein the bearer setup request is received from a policy and charging rules function, PRCF, in the access network.

Embodiment 23. A packet data network gateway (P-GW) of an access network including a radio access network, comprising:
a transceiver (5001) configured to provide communications with a wireless terminal served by the radio access network and a network node in the access network; and
a processor (5003) coupled to the transceiver and configured to provide network communication through the transceiver, wherein the processor is configured to perform operations according to any of Embodiments 19 to 22.

Embodiment 24. A packet data network gateway of an access network including a radio access network, wherein the packet data network gateway is adapted to perform operations according to any of Embodiments 19 to 22.

Embodiment 25. A method by a service (610) operating in an application server (590), comprising:
  sending (902), to a network node (510) in an access network (200) including a radio access network (100) and a packet data network gateway (P-GW), a service setup request (615) via a packet switched data communication network (580), wherein the service setup request is to set up a packet switched connection between the external service and a wireless terminal (10) served by the radio access network; and
  negotiating (904) a quality of service, QoS, level with the external service for the packet switched connection, wherein the QoS level comprises a plurality of QoS parameters including a minimum QoS duration for a bearer (410) between the packet data network gateway and the wireless terminal, the bearer having the QoS level.

Embodiment 26. A method according to Embodiment 25, wherein the external service provides a list of acceptable values of minimum QoS duration to the network node, and the network node selects the minimum QoS duration from the list of acceptable values of minimum QoS duration.

Embodiment 27. A method according to Embodiment 25, wherein the network node provides a list of acceptable values of minimum QoS duration to the external service, and the external service selects the minimum QoS duration from the list of acceptable values of minimum QoS duration.

Embodiment 28. A method according to any of Embodiments 25-27, wherein the network node comprises a policy and charging rules function, PRCF, in the access network.

Embodiment 29. A method according to any of Embodiments 25-28, wherein the bearer comprises an evolved packet system, EPS, bearer.

Embodiment 30. A method according to any of Embodiments 25-29, wherein the minimum QoS level is set according to a QoS required by the external service.

Embodiment 31. A method according to any of Embodiments 25-30, further comprising:
  sending a notification to the external service in response to determining that the QoS level cannot be maintained for at least the minimum QoS duration.

Embodiment 32. A method according to any of Embodiments 25-31, wherein the negotiated QoS level allows for exceptions to at least one of the QoS parameters.

Embodiment 33. A method according to any of Embodiments 25-32, wherein the negotiated QoS level provides different minimum QoS durations for different types of bearers.

Embodiment 34. An application server (590), comprising:
  a network interface (1607) configured to provide communications with a packet data network (580); and
  a processor (1603) coupled to the transceiver and configured to provide network communication through the transceiver, wherein the processor is configured to perform operations according to any of Embodiments 25 to 33.

Embodiment 35. An application server (590), wherein the server is adapted to perform operations according to any of Embodiments 25 to 33.

Explanations for abbreviations from the above disclosure are provided below.

ABBREVIATION EXPLANATION

4G Fourth Generation
5G Fifth Generation
EPS Evolved Packet System
QoS Quality of Service
PCC Policy and Charging Control
LTE Long-Term Evolution
MAC Medium Access Control
gNB Base station in NR
eNB E-UTRAN NodeB
RAN Radio Access Network
RRC Radio Resource Control
SGW Serving Gateway
UTRA Universal Terrestrial Radio Access
UTRAN Universal Terrestrial Radio Access Network
PDCP Packet Data Convergence Protocol
RLC Radio Link Control
PGW Packet Gateway
MME Mobility Management Entity
NAS Non Access Stratum
AS Access Stratum
RAB Radio Access Bearer
SGSN Serving GPRS Support Node
HSS Home Subscriber Server
HLR Home Location Register
PCRF Policy and Charging Rules Function
PDN Packet Data Network
SPR Subscriber Profile Repository
AF Application Function
PCF Policy Control Function
SMF Session Management Function
GPRS General Packet Radio Services Citations for references from the above disclosure are provided below.

Reference [1]: 3GPP TS 36.300 V15.1.0; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); 2018-03

Reference [2]: 3GPP TS 23.501 V15.1.0; Technical Specification Group Services and System Aspects; System Architecture for the 5G System; Stage 2 (Release 15); 2018-03

Reference [3]: 3GPP TR 38.804 V14.0.0; Technical Specification Group Radio Access Network; Study on New Radio Access Technology; Radio Interface Protocol Aspects (Release 14); 2017-03

Reference [4]: 3GPP TS 23.203
Reference [5]: US20020114305A1
Reference [6]: US20160021592A1
Reference [7]: US20160080578A1

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
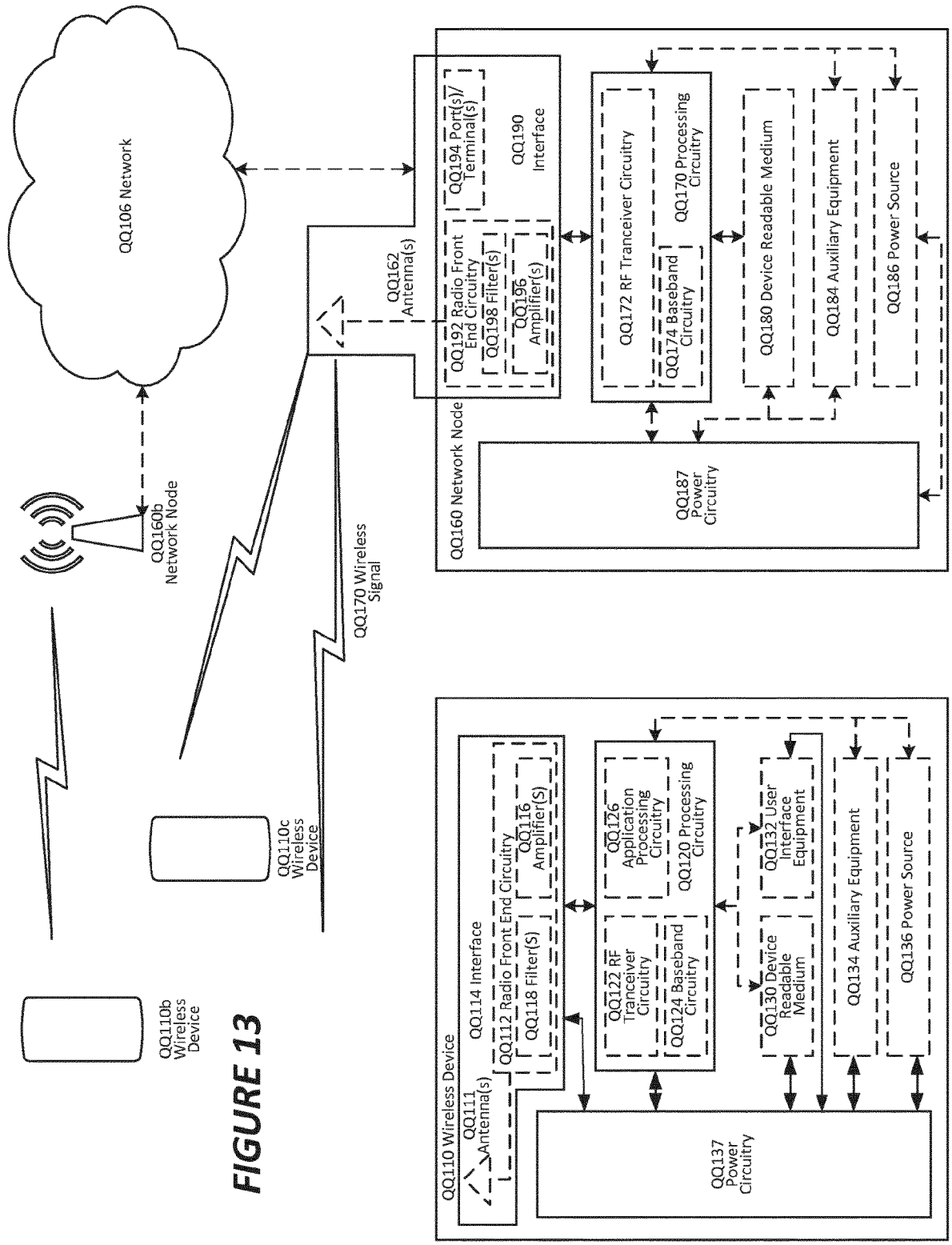
FIG. 13 is a block diagram of a wireless network in accordance with some embodiments.

FIG. 13: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network QQ106, network nodes QQ160 and QQ160b, and WDs QQ110, QQ110b, and QQ110c (also referred to as wireless terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 13 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a wireless terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 14:
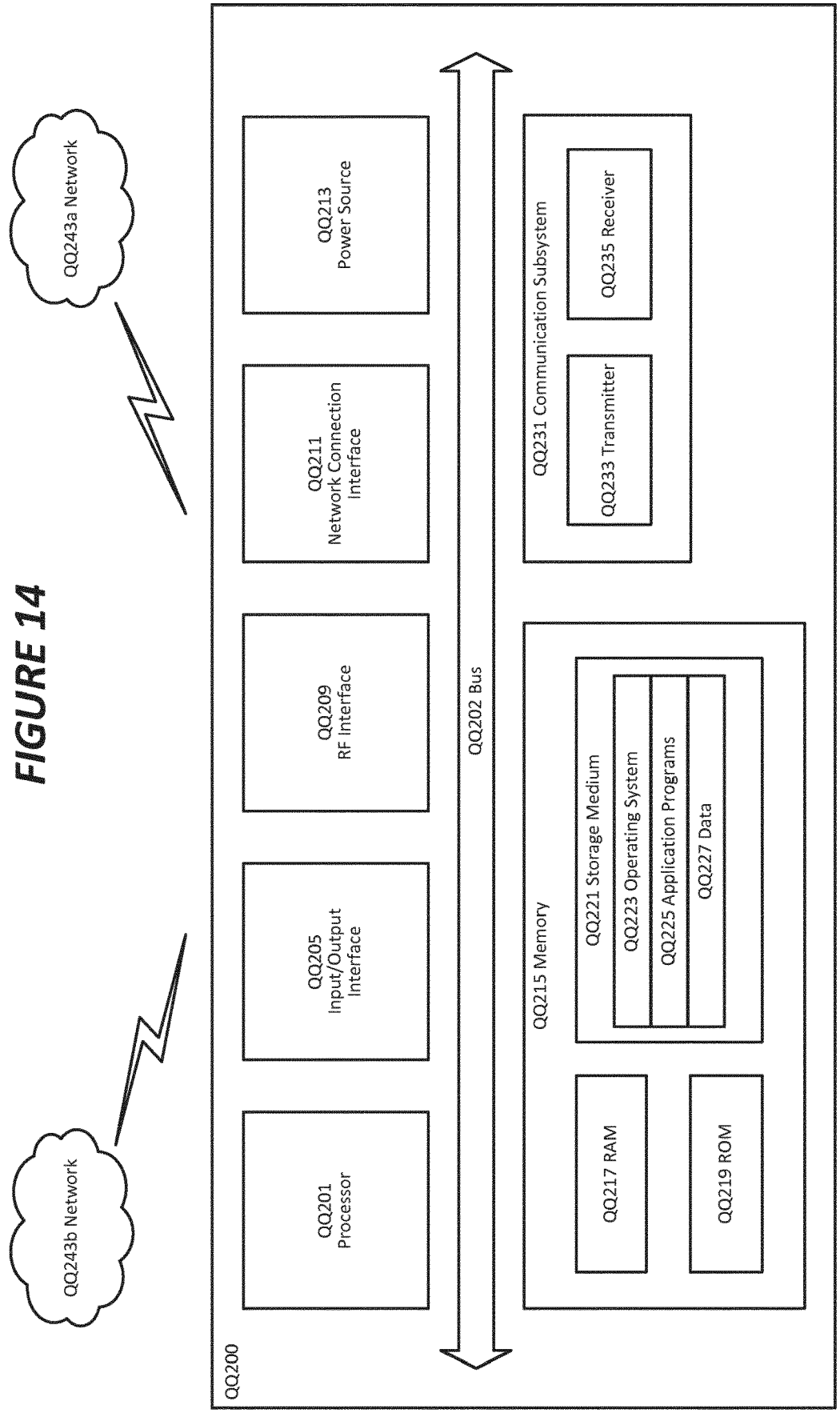
FIG. 14 is a block diagram of a user equipment in accordance with some embodiments

FIG. 14: User Equipment in accordance with some embodiments

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 14, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 15:
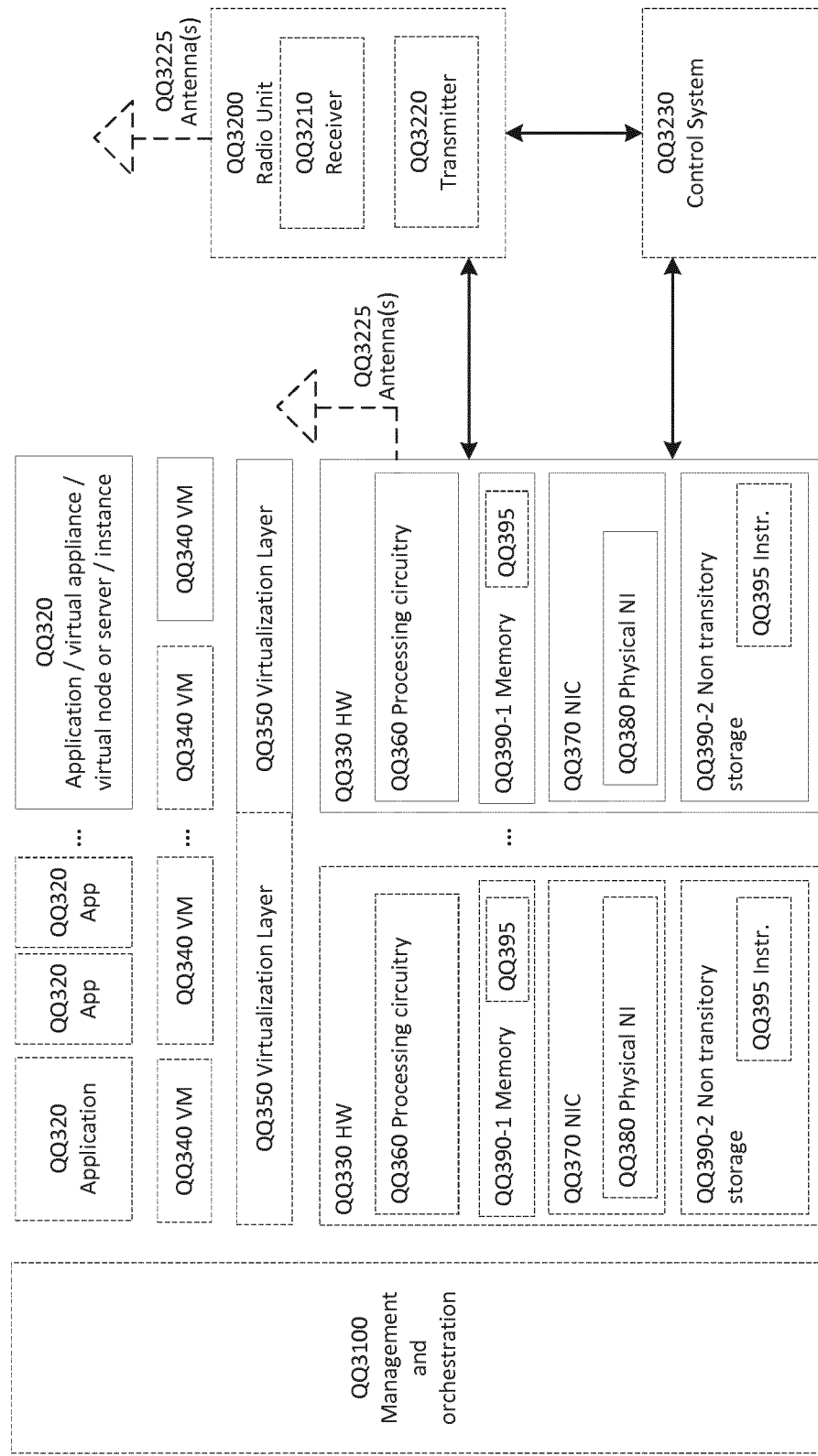
FIG. 15 is a block diagram of a virtualization environment in accordance with some embodiments.

FIG. 15: Virtualization environment in accordance with some embodiments

FIG. 15 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 15, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 15.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 16:
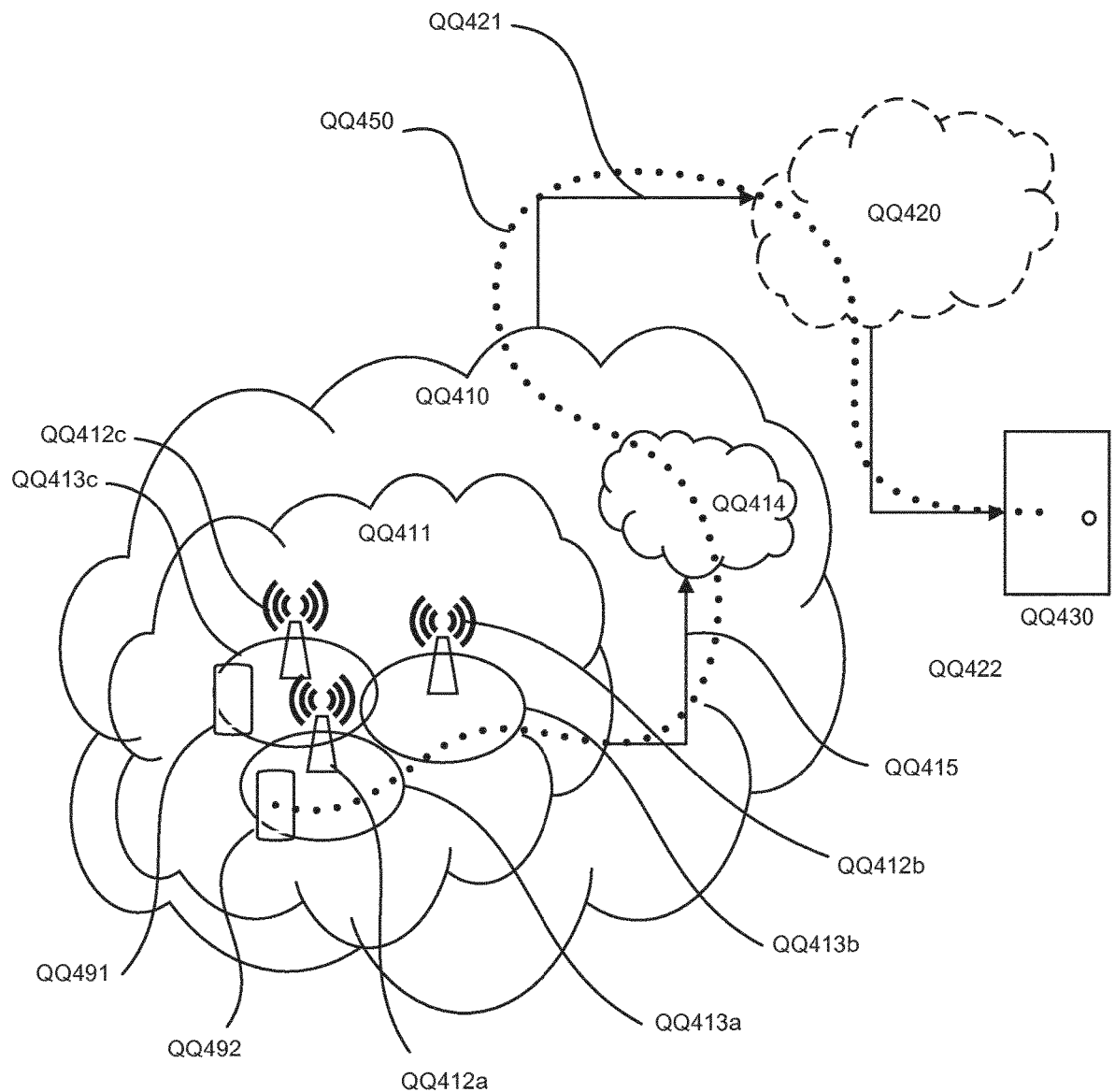
FIG. 16 is a block diagram of a telecommunication network connected via an intermediate network to a host computer in accordance with some embodiments.

FIG. 16: Telecommunication network connected via an intermediate network to a host computer in accordance with some embodiments.

With reference to FIG. 16, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 16 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 17:
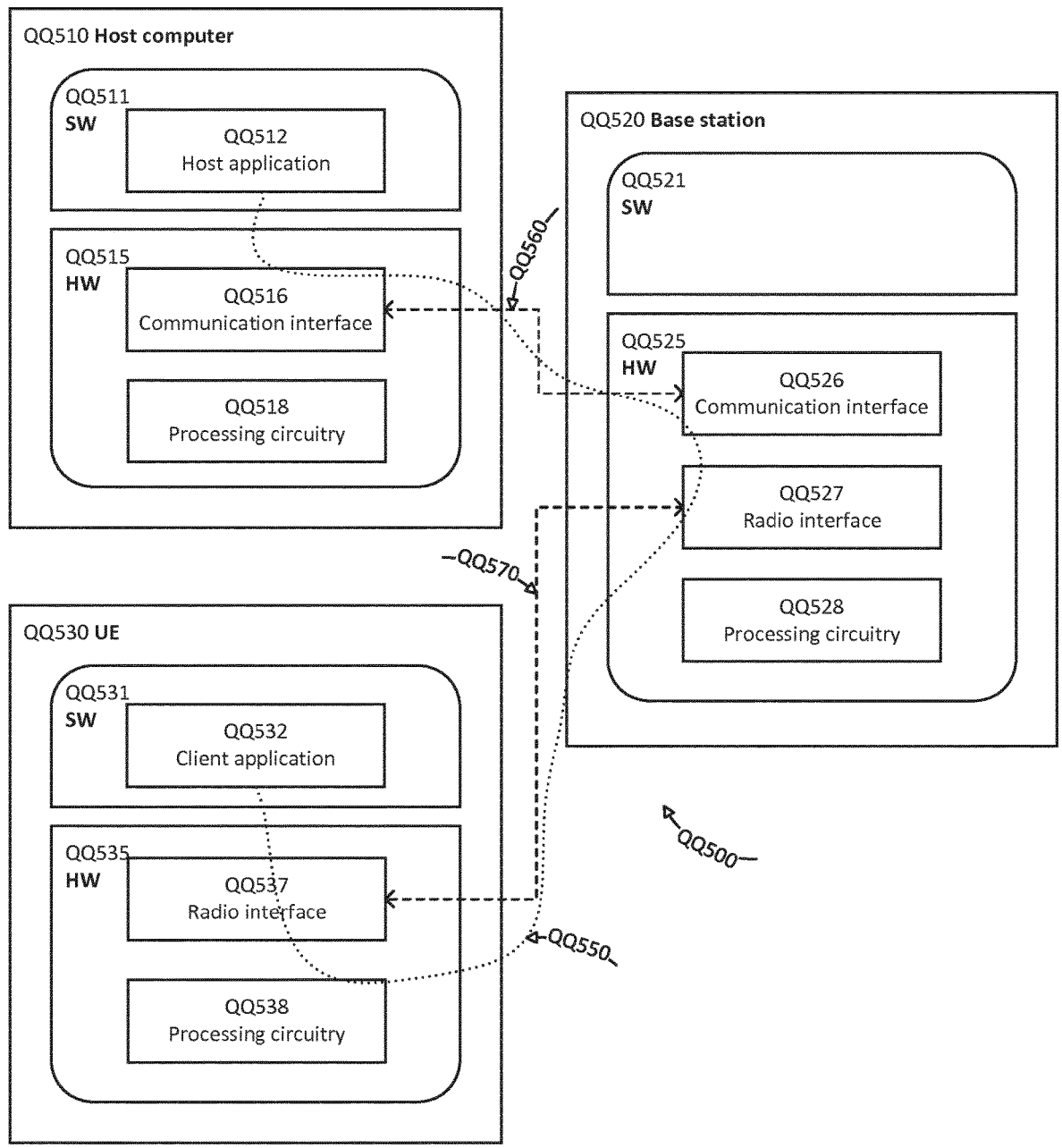
FIG. 17 is a block diagram of a host computer communicating via a base station with a user equipment over a partially wireless connection in accordance with some embodiments.

FIG. 17: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 17) served by base station QQ520. Communication interface QQ526 may be configured to facilitate connection QQ560 to host computer QQ510. Connection QQ560 may be direct or it may pass through a core network (not shown in FIG. 17) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 17 may be similar or identical to host computer QQ430, one of base stations QQ412a, QQ412b, QQ412c and one of UEs QQ491, QQ492 of FIG. 16, respectively. This is to say, the inner workings of these entities may be as shown in FIG. 17 and independently, the surrounding network topology may be that of FIG. 16.

In FIG. 17, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 18:
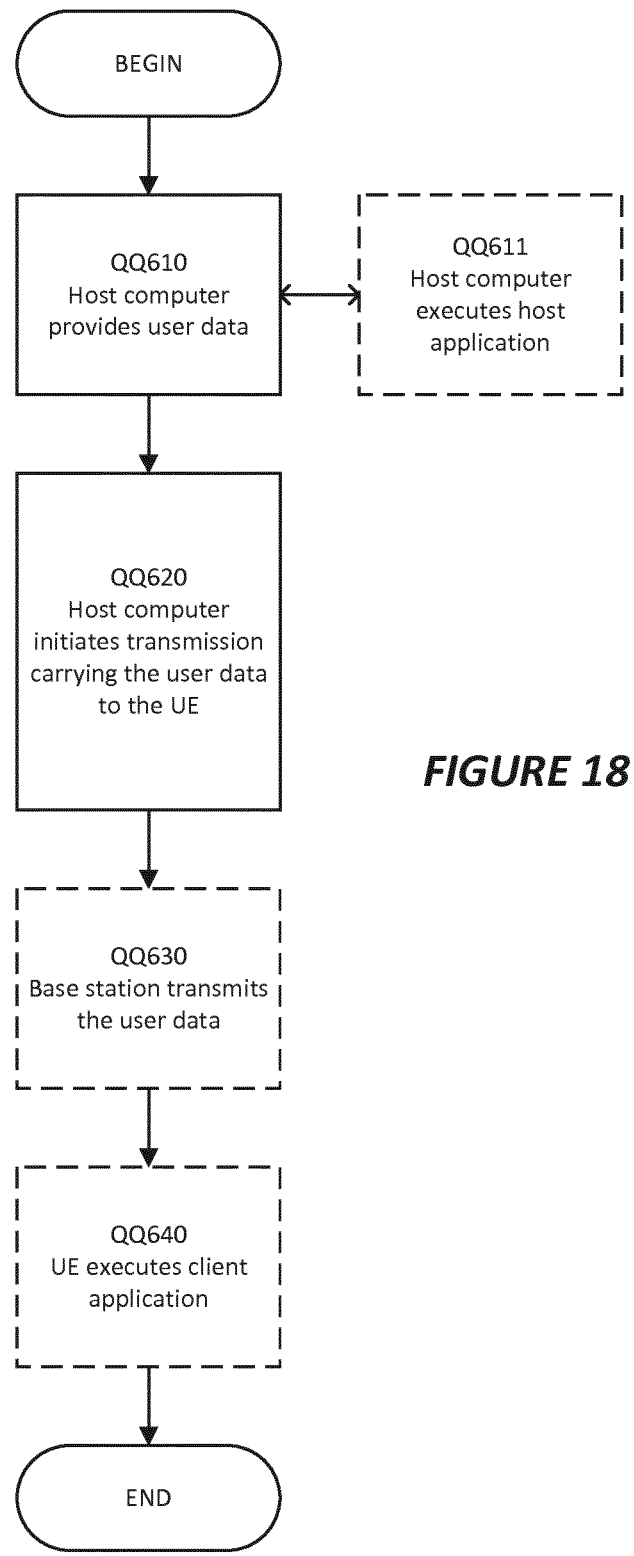
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 19:
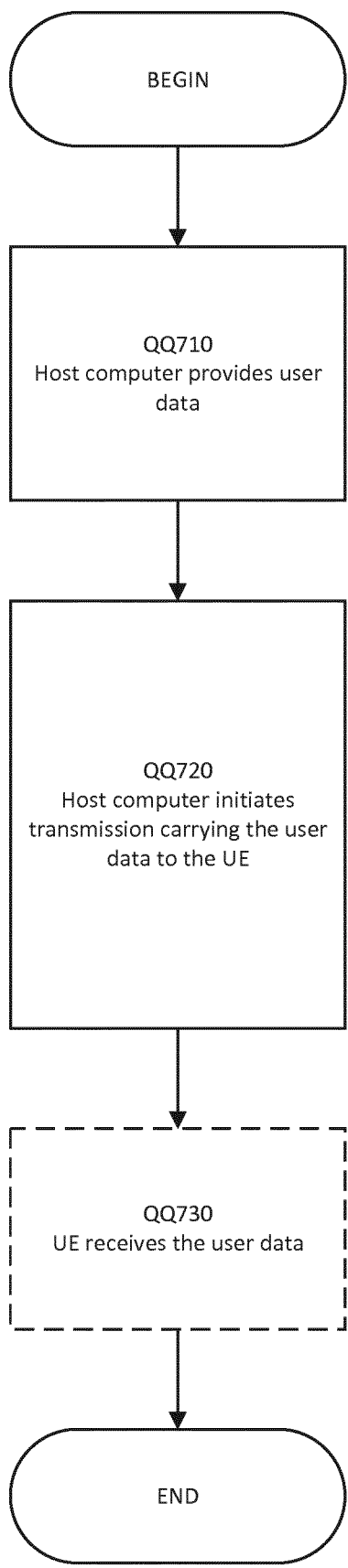
FIG. 19 is a block diagram of methods implemented in a communication system including a host computer, a base station and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 20:
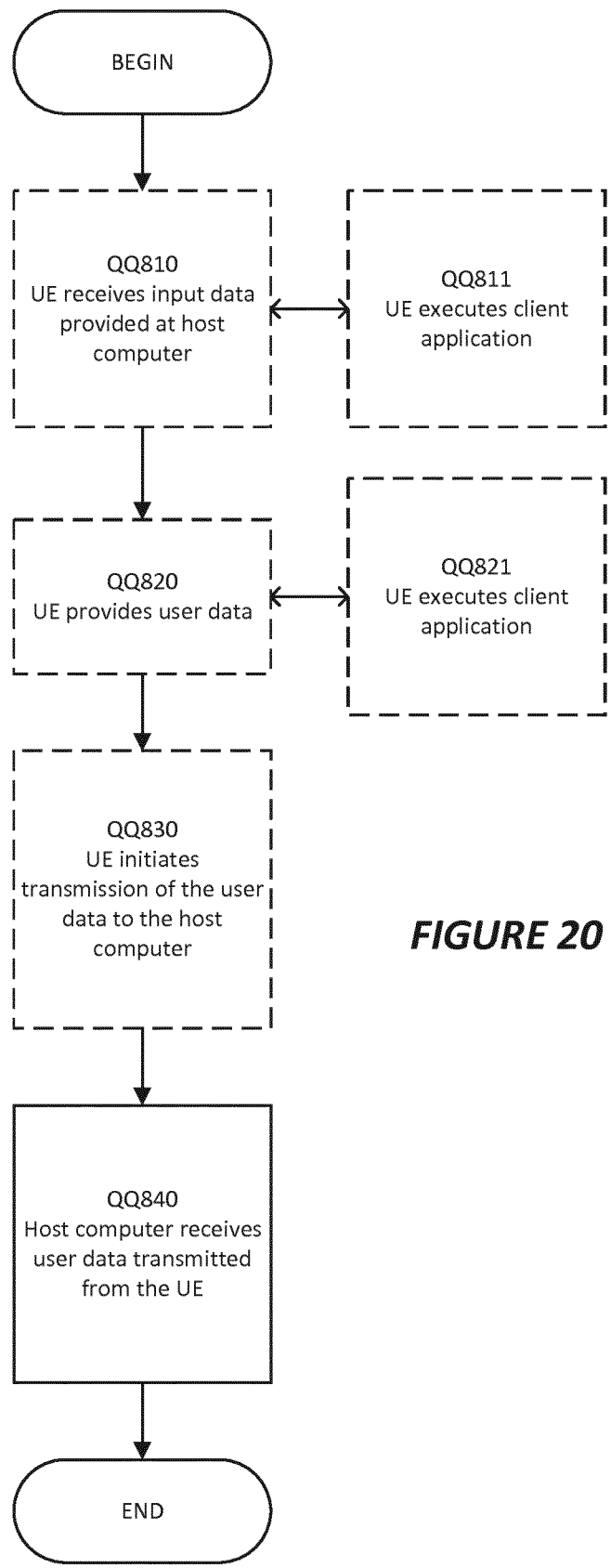
FIG. 20 is a block diagram of methods implemented in a communication system including a host computer, a base station and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 21:
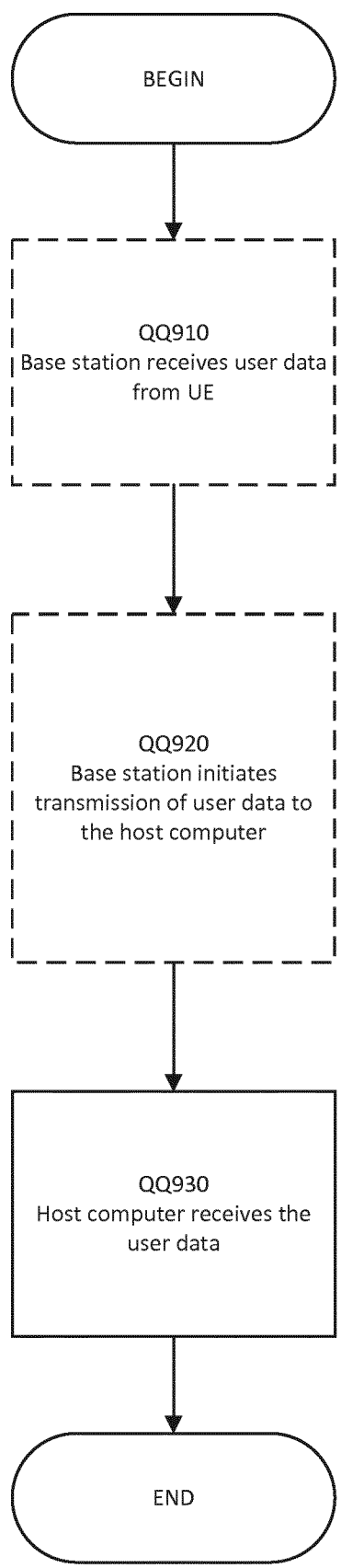
FIG. 21 is a block diagram of methods implemented in a communication system including a host computer, a base station and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation.

The invention claimed is:

1. A method in an access network including a radio access network and a packet data network gateway (P-GW), the method comprising:
receiving, at a network node in the access network, a service setup request from an external service via a packet switched data communication network, wherein the service setup request is to set up a packet switched connection between the external service and a wireless terminal served by the radio access network;
negotiating a quality of service level with the external service for the packet switched connection, wherein the QoS level comprises a plurality of QoS parameters including a minimum QoS duration, wherein the QoS parameters include a preferred window for adjustments to the QoS and one or more time windows in which adjustments may not happen or are preferred not to happen; and
causing the packet data network gateway to establish a bearer between the packet data network gateway and the wireless terminal, the bearer having the QoS level.

2. The method according to claim 1, further comprising:
maintaining the bearer with at least the QoS level for at least the minimum QoS duration.

3. The method according to claim 1, further comprising:
setting a duration of a bearer activity timer associated with the bearer to be equal to or greater than the minimum QoS duration;
renegotiating the QoS level with the external service upon expiration of the bearer activity timer or minimum QoS duration.

4. The method according to claim 1, wherein the external service provides a list of acceptable values of minimum QoS duration to the network node, and the network node selects the minimum QoS duration from the list of acceptable values of minimum QoS duration.

5. The method according to claim 1, wherein the network node provides a list of acceptable values of minimum QoS duration to the external service, and the external service selects the minimum QoS duration from the list of acceptable values of minimum QoS duration.

6. The method according to claim 5, wherein the network node comprises a policy and charging rules function (PRCF) in the access network and wherein the bearer comprises one or more of an evolved packet system, EPS, bearer, and related radio, S1, S5/S8 bearers composing the EPS bearer.

7. The method according to claim 1, further comprising:
detecting a change in network conditions affecting the wireless terminal; and
renegotiating the QoS level including the minimum QoS duration with the external service in response to detecting the change in network conditions or renegotiating the QoS level including the minimum QoS duration with the external service in response to a request from the external service to renegotiate the QoS.

8. The method according to claim 1, wherein the access network attempts to maintain a quality of the packet switched connection at least at the QoS level during the minimum QoS duration, wherein a minimum QoS level is set according to a QoS required by the external service.

9. The method according to claim 1, further comprising:
sending a notification to the external service in response to determining that the QoS level cannot be maintained for at least the minimum QoS duration.

10. The method according to claim 1, wherein the negotiated QoS level allows for exceptions to at least one of the QoS parameters, and wherein the QoS parameters include a maximum allowable frequency of adjustments to the QoS.

11. The method according to claim 1, wherein the negotiated QoS level provides different minimum QoS durations for different types of bearers.

12. The method according to claim 1, further comprising:
increasing a service priority associated with the bearer to avoid violating a QoS parameter.

13. A network node of an access network including a radio access network and a packet data network gateway (P-GW), the network node comprising:
a transceiver configured to provide communications with the packet data network gateway; and
a processor coupled to the transceiver and configured to provide network communication through the transceiver, wherein the processor is configured to perform operations according to claim 1.

14. A method performed by a packet data network gateway (P-GW) in an access network including a radio access network, the method comprising:
receiving a bearer setup request, wherein the bearer setup request is to set up a bearer to a wireless terminal served by the radio access network, wherein the bearer setup request specifies a quality of service (QoS) level for the bearer, wherein the QoS level comprises a plurality of QoS parameters including a minimum QoS duration wherein the QoS parameters include a preferred window for adjustments to the QoS and one or more time windows in which adjustments may not happen or are preferred not to happen;
establishing the bearer between the packet data network gateway and the wireless terminal, the bearer having the QoS level; and
maintaining the bearer with at least the QoS level for at least the minimum QoS duration, wherein if it is expected that the QoS level cannot be fulfilled, the service priority is increased to fulfill the constraint of avoiding bearer adjustments in the one or more time windows.

15. The method according to claim 14, further comprising:
setting a duration of a bearer activity timer associated with the bearer to be greater than the minimum QoS duration.

16. A packet data network gateway (P-GW) of an access network including a radio access network, comprising:
- a transceiver configured to provide communications with a wireless terminal served by the radio access network and a network node in the access network; and
- a processor coupled to the transceiver and configured to provide network communication through the transceiver, wherein the processor is configured to perform operations according to claim 1.

17. A method by a service operating in an application server, comprising:
- sending, to a network node in an access network including a radio access network and a packet data network gateway (P-GW), a service setup request via a packet switched data communication network, wherein the service setup request is to set up a packet switched connection between the external service and a wireless terminal served by the radio access network; and
- negotiating a quality of service, QoS, level with the external service for the packet switched connection, wherein the QoS level comprises a plurality of QoS parameters including a minimum QoS duration for a bearer between the packet data network gateway and the wireless terminal, the bearer having the QoS level, wherein the QoS parameters include a preferred window for adjustments to the QoS and one or more time windows in which adjustments may not happen or are preferred not to happen, and wherein a minimum QoS level is set according to a QoS required by the external service.

18. The method according to claim 17, wherein the external service provides a list of acceptable values of minimum QoS duration to the network node, and the network node selects the minimum QoS duration from the list of acceptable values of minimum QoS duration.

19. The method according to claim 17, wherein the network node provides a list of acceptable values of minimum QoS duration to the external service, and the external service selects the minimum QoS duration from the list of acceptable values of minimum QoS duration.

20. An application server, comprising:
- a network interface configured to provide communications with a network node in an access network; and
- a processor coupled to the network interface and configured to provide network communication through the network interface, wherein the processor is configured to perform operations according to claim 17.

* * * * *